(12) United States Patent
Price

(10) Patent No.: US 12,502,126 B2
(45) Date of Patent: Dec. 23, 2025

(54) WEARABLE DEVICE

(71) Applicant: Dawn Price, Ashington (GB)

(72) Inventor: Dawn Price, Ashington (GB)

( * ) Notice: Subject to any disclaimer, the term of this patent is extended or adjusted under 35 U.S.C. 154(b) by 258 days.

(21) Appl. No.: 17/755,245

(22) PCT Filed: Dec. 28, 2020

(86) PCT No.: PCT/IB2020/062498
§ 371 (c)(1),
(2) Date: Apr. 25, 2022

(87) PCT Pub. No.: WO2021/079358
PCT Pub. Date: Apr. 19, 2021

(65) Prior Publication Data
US 2022/0361810 A1 Nov. 17, 2022

(30) Foreign Application Priority Data

Oct. 25, 2019 (GB) ..................................... 1915507
Oct. 26, 2020 (GB) ..................................... 2016994

(51) Int. Cl.
*A61B 5/00* (2006.01)
*A61B 5/0205* (2006.01)
(Continued)

(52) U.S. Cl.
CPC .......... *A61B 5/4833* (2013.01); *A61B 5/0022* (2013.01); *A61B 5/02055* (2013.01);
(Continued)

(58) Field of Classification Search
CPC . A61B 5/4833; A61B 5/0022; A61B 5/02055; A61B 5/117; A61B 5/681; G06F 1/163
See application file for complete search history.

(56) References Cited

U.S. PATENT DOCUMENTS 10,430,557 B2 * 10/2019 Bowers .................. H04L 67/52
2009/0137888 A9 * 5/2009 Berman .................. G16H 40/67
600/347
(Continued)

FOREIGN PATENT DOCUMENTS

EP 3693057 B1 * 10/2022 ......... A41D 13/1281
KR 101949102 B1 2/2019
(Continued)

OTHER PUBLICATIONS

I. Maglogiannis, G. Spyroglou, C. Panagopoulos, M. Mazonaki and P. Tsanakas, "Mobile reminder system for furthering patient adherence utilizing commodity smartwatch and Android devices," 2014, pp. 124-127, doi: 10.4108/Mobihealth33544.2014.7015925. (Year: 2014).*

(Continued)

*Primary Examiner* — Sun M Li
(74) *Attorney, Agent, or Firm* — Shumaker, Loop & Kendrick, LLP; James D. Miller

(57) ABSTRACT

A wearable medication adherence monitoring (MAM) device for wearing by a patient, including an operating unit (OU) which includes: a wireless communications unit (WCU); a processing unit (CPU); a memory unit; and one or a plurality of peripheral interface(s) with a plurality of input peripherals; and further includes the plurality of input peripherals and output peripherals in a MAM unit (MAMU) which includes: an interactive visual display unit (VDU) including a visual display (VD) and a VD patient interaction (PI) tool (VDTOOL); and an interactive audio platform (AP) including an audio output unit (SPK) and an audio PI tool (MIC; and one or a plurality of sensor unit(s) (SU(s)) including at least one biomarker sensor, and optionally at least one biometric sensor; included in one or a plurality of (Continued)

Modular Wearable Device attachment units (AU) for wearing of the device on or about a body part of the patient.

20 Claims, 4 Drawing Sheets

(51) Int. Cl.
*A61B 5/117* (2016.01)
*G16H 20/13* (2018.01)
*G16H 40/67* (2018.01)
*A61B 5/024* (2006.01)
*G06F 1/16* (2006.01)

(52) U.S. Cl.
CPC ............ *A61B 5/117* (2013.01); *A61B 5/4803* (2013.01); *A61B 5/4875* (2013.01); *A61B 5/681* (2013.01); *A61B 5/7405* (2013.01); *A61B 5/742* (2013.01); *G16H 20/13* (2018.01); *G16H 40/67* (2018.01); *A61B 5/02438* (2013.01); *A61B 2560/0214* (2013.01); *A61B 2562/0204* (2013.01); *G06F 1/163* (2013.01)

(56) References Cited

U.S. PATENT DOCUMENTS

| | | | | |
|---|---|---|---|---|
| 2009/0322513 | A1* | 12/2009 | Hwang | H04W 4/90 600/301 |
| 2010/0056873 | A1* | 3/2010 | Allen | A61B 5/6804 600/300 |
| 2013/0217982 | A1* | 8/2013 | Behzadi | A61B 5/07 600/302 |
| 2016/0125145 | A1* | 5/2016 | Kim | G16H 20/10 705/3 |
| 2016/0342767 | A1* | 11/2016 | Narasimhan | G16H 20/10 |
| 2017/0100035 | A1* | 4/2017 | Heikenfeld | A61B 5/14517 |
| 2018/0046776 | A1* | 2/2018 | Chalifoux | G16H 20/13 |
| 2018/0303616 | A1* | 10/2018 | Bhattacharyya | B33Y 50/02 |

FOREIGN PATENT DOCUMENTS

| | | |
|---|---|---|
| WO | 2015091602 A1 | 6/2015 |
| WO | 2016187374 A1 | 11/2016 |
| WO | 2016205594 A1 | 12/2016 |
| WO | 2017066292 A1 | 4/2017 |
| WO | 2018140470 A1 | 8/2018 |

OTHER PUBLICATIONS

Daniel Rosner, Andrei-Tiberiu Jurba, Razvan Tataroiu, Constantin Ilas; "Wearable Medication Reminder Architecture Enhancement." 2015 20th International Conference on Control Systems and Science (Year: 2015) (Year: 2015).*

T. J. Voss, V. Subbian and F. R. Beyette, "Feasibility of energy harvesting techniques for wearable medical devices," 2014 36th Annual International Conference of the IEEE Engineering in Medicine and Biology Society, Chicago, IL, USA, 2014, pp. 626-629, doi: 10.1109/EMBC.2014.6943669 (Year: 2014).*

Khan S, Ali S, Bermak A. Recent Developments in Printing Flexible and Wearable Sensing Electronics for Healthcare Applications. Sensors (Basel). Mar. 11, 2019;19(5):1230. doi: 10.3390/s19051230. PMID: 30862062; PMCID: PMC6427552. (Year: 2019).*

G. Yang, G. Pang, Z. Pang, Y. Gu, M. Mantysalo and H. Yang, "Non-Invasive Flexible and Stretchable Wearable Sensors With Nano-Based Enhancement for Chronic Disease Care," in IEEE Reviews in Biomedical Engineering, vol. 12, pp. 34-71, 2019, doi: 10.1109/RBME.2018.2887301. (Year: 2018).*

Md Abu Sayeed Mondol, Ifat Afrin Emi, and John A. Stankovic, MedRem: An Interactive Medication Reminder and Tracking System on Wrist Devices; 8 pages; 2016 IEEE Wireless Health; Oct. 25, 2016; DOI: 10.1109/WH.2016.7764555.

Murtadha Aldeer et al:"A Review of Medication Adherence Monitoring Technologies", Applied System Innovation; vol. 1,No. 2, May 6, 2018; DOI: 10.3390/asi1020014; 27 pages.

* cited by examiner

Figure 1 – Hospitalisation rate by maximum gap in therapy (P = 0.004)
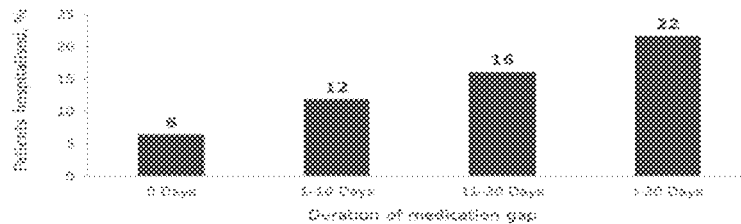
Figure 2 – Wearable Device
FIG 2a
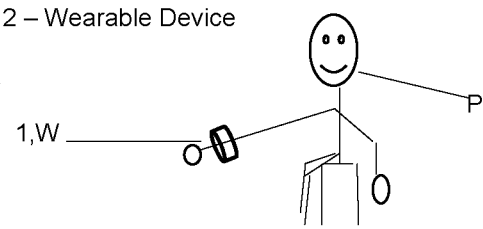
FIG 2b
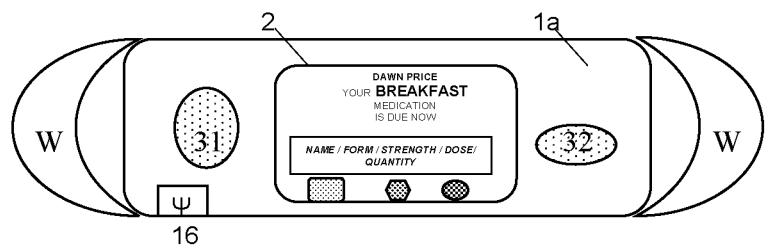
FIG 2c High Fidelity Wearable Device
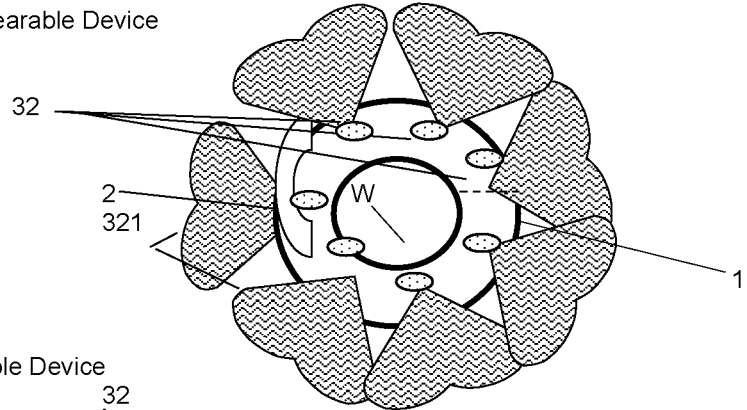
Fig 2d Modular Wearable Device
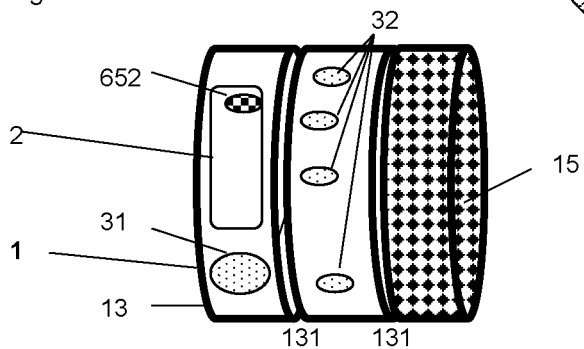

Figure 3a – Interactive VDU (dose reminder)
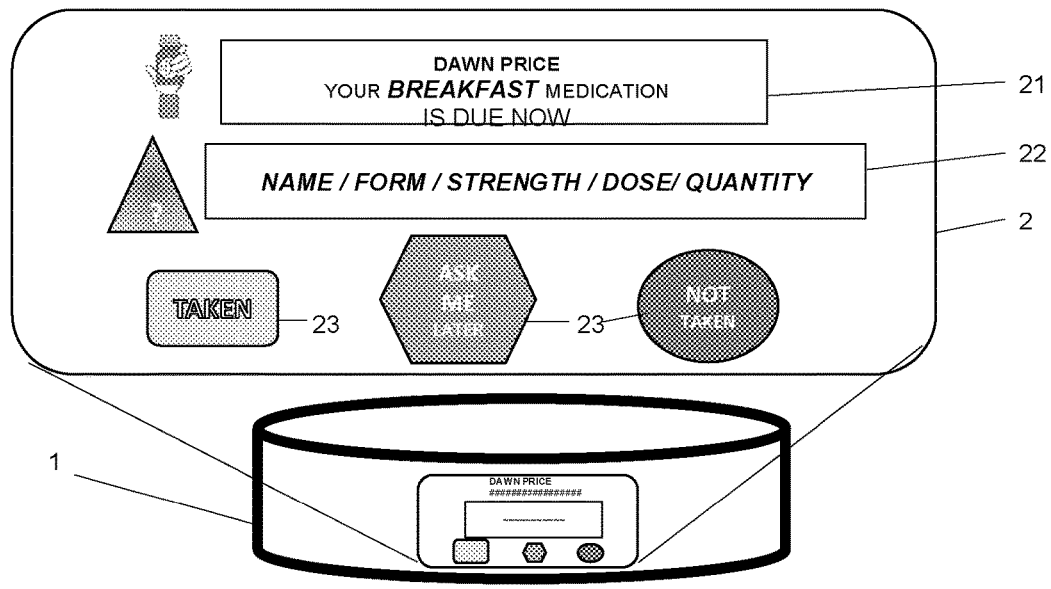
Figure 4b – Interactive Visual Display Unit and Audio Platform
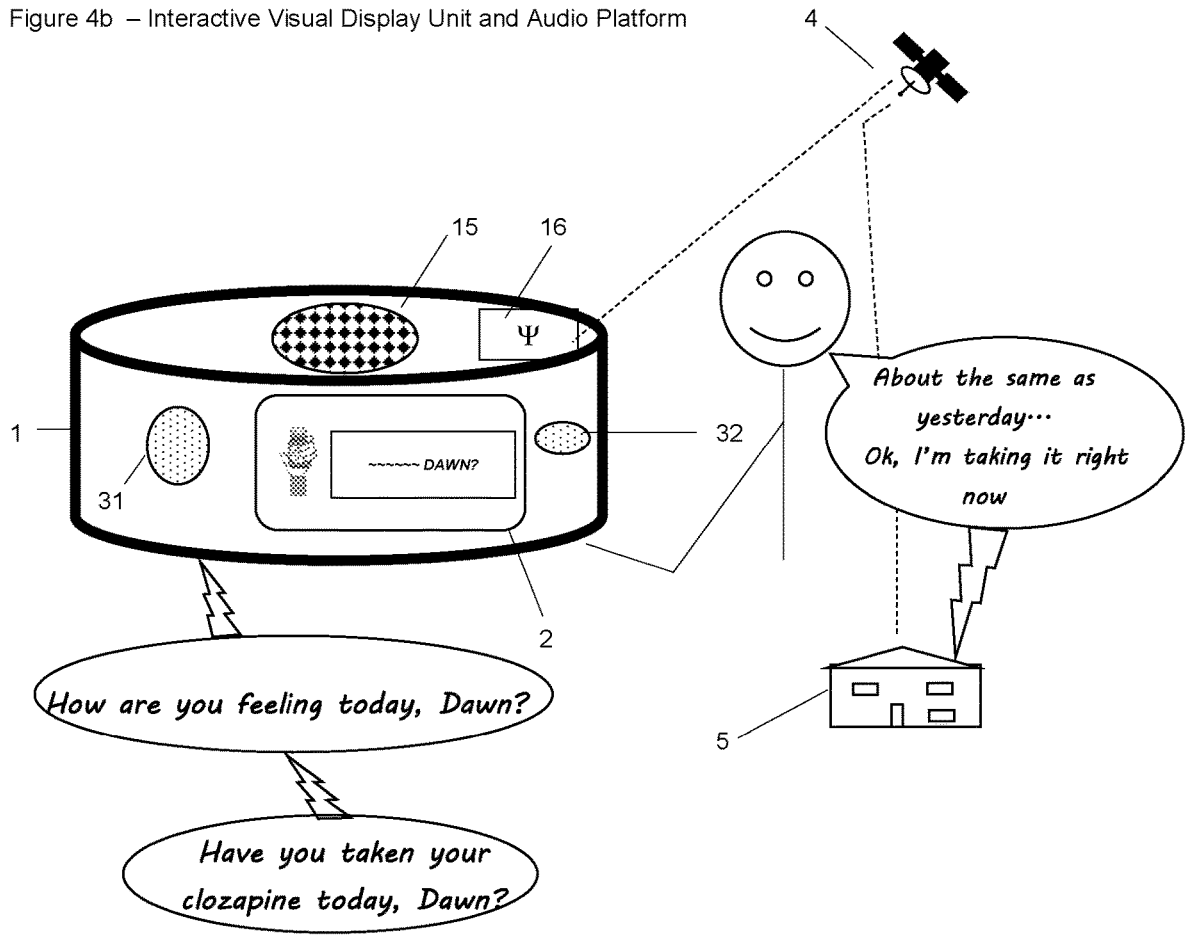

Figure 5a – Operating Unit and responsive MAMU of a wearable device
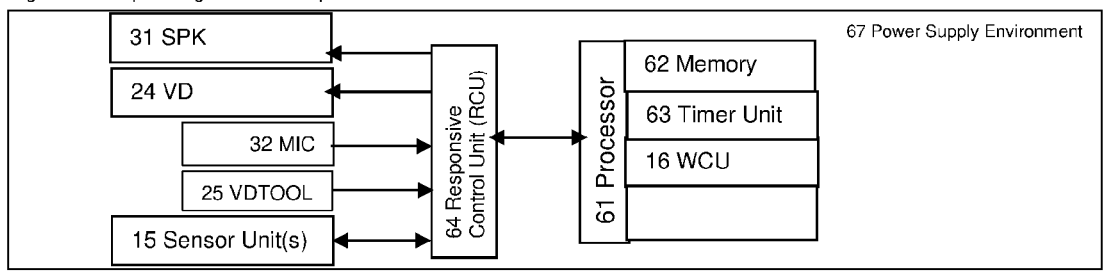
Figure 5b – Flow scheme of MAM in a wearable device
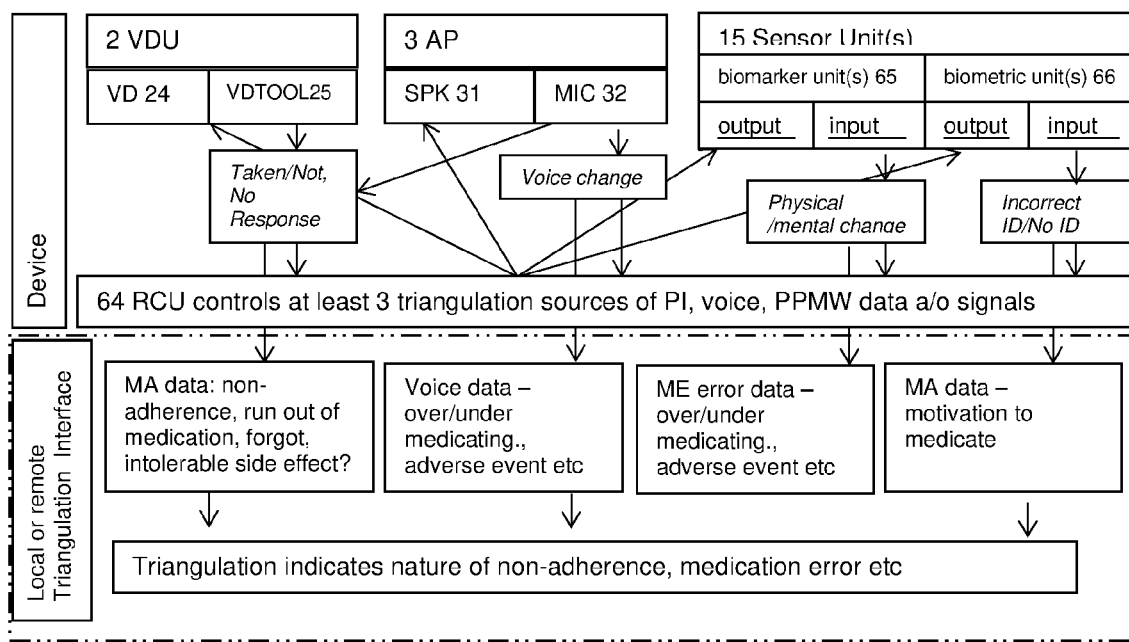
Figure 6a – Flow scheme On-Demand MAM
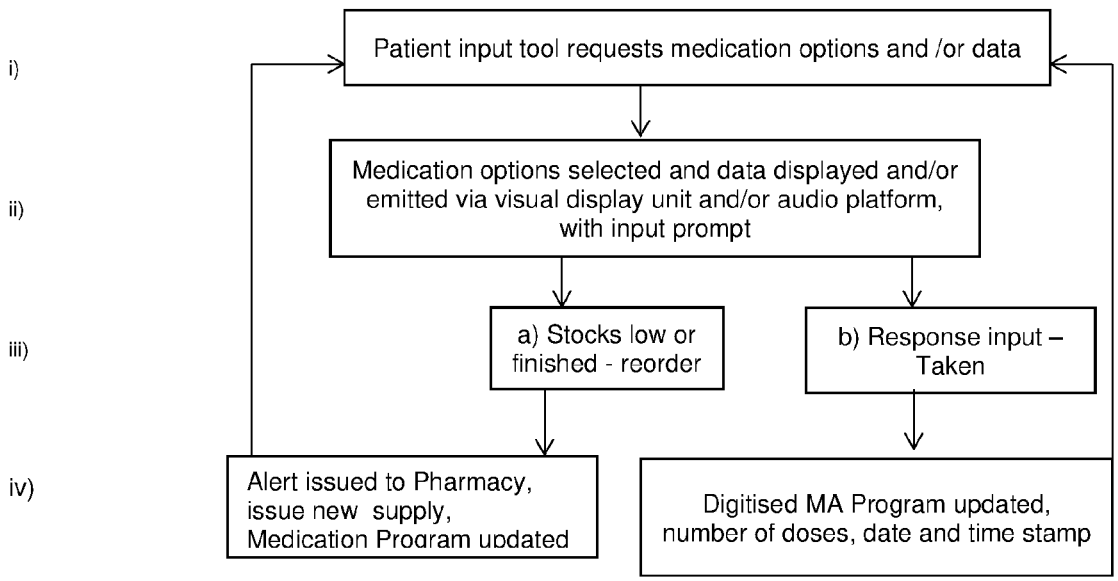

Figure 6b – Flow scheme Medication Administration Monitoring
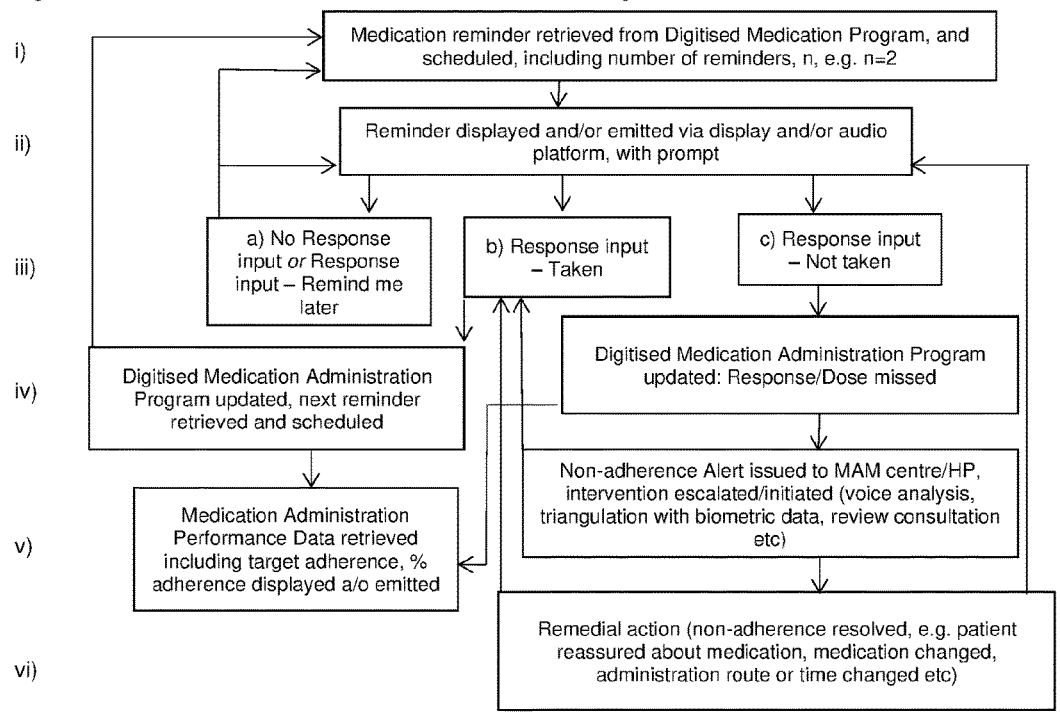
Figure 7 – MAM System
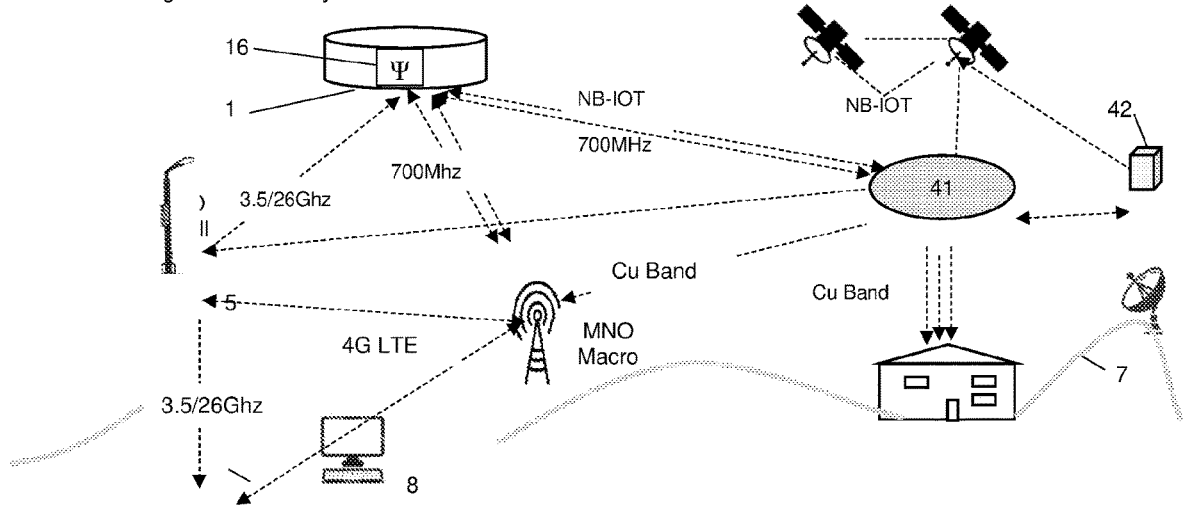
Figure 8 – Identification tag

WEARABLE DEVICE

CROSS-REFERENCE TO RELATED APPLICATIONS

This patent application is a United States nation phase patent application based on PCT/IB2020/062498 filed on Dec. 28, 2020, which claims the benefit of GB Patent Application No. GB 1915507.6 filed on Oct. 25, 2019 and GB Patent Application No. GB 2016994.2 filed on Oct. 26, 2020, the entire disclosures of which are hereby incorporated herein by reference.

FIELD

This disclosure relates to a personal wireless digital device for supporting a patient in receipt of medication treatment, more particularly for improving a healthcare outcome of the patient, through improved medication adherence and reduced medication error; a method for the manufacture thereof, the use thereof, in particular in a method for supporting a patient in receipt of medication treatment, a data processing system and network communication system comprising the device and associated aspects. Priority is claimed from UK patent applications GB1915507 and GB2016994, the contents of which are incorporated herein by reference.

BACKGROUND

The single most important healthcare intervention for treating and preventing disease conditions in the UK and elsewhere is providing medicines. Despite this, the World Health Organisation estimates that worldwide 50% of people do not take medications as intended (indicated as non-adherence, NA); and that NA accounts for 57% of an estimated US$500Bn wasted from suboptimal medications use.

NA is also a frequent cause of impairment, hospitalisation, increased morbidity and mortality including higher risk of suicide, longer time to remission, psychiatric emergencies, poor mental performance and low satisfaction with life. Any single one of these outcomes should be considered to be unsafe practice and a failure of effective medication treatment.

There is a need to support patients in managing medications, and most urgently patients managing multiple medications, and those with multiple conditions, memory problems, a learning difficulty or age-related challenges. The scale of this problem was reported in a study in 2017 which identified that in the UK, 49% of older people over 65 years are taking 5 or more medicines a day (20+ doses per day).

The MaPPs system (Medicines: A Patient Profile Summary) is used by healthcare to support patients with medication. Healthcare staff register patients onto the MaPPs system that creates a bespoke patient account together with a list of medicines for the patient. Despite uniquely providing simplified medicines information, NA remains a challenge.

Medication monitoring in clinical practice is currently delivered with patients attending periodic review appointments, taking up clinic, staff and facility time. Current practice relies on a rolling review system, which is not equipped to identify patients at risk of NA, and patients in need of urgent review, from patients satisfactorily managing appropriate medication.

There remains a need to address disadvantages of the prior art, in particular to provide personalised technologies to support patients to live independently as they wish within their own homes and beyond and to transform medication review pathways and/or provide support for early intervention that prevents decline.

SUMMARY

Aspects of this disclosure provide a technological solution configured to promote patient medication adherence (MA) and enable medication adherence monitoring (MAM) and identification of patients at risk of NA and of medication error (ME) or in need of urgent review, more particularly to provide for the patient a clearer picture of medication, and of medication adherence (MA) incorporated as a marker (marker-of-self) of medication actually taken, and to provide for medication adherence monitoring (MAM) permitting the timely detection of onset of medication error (ME), and intervention with appropriate corrective measures. Healthcare professionals (HP) frequently unnecessarily change or discontinue medication, increase dose or add concomitant medication to address what appears to be a poor medication response in a patient who in reality has an adherence problem. Such unnecessary prescribing is a potential risk to patient safety. Thus, devices and systems herein can improve MA and fundamentally support de-prescribing, that is to say reducing or stopping medications that may no longer be of benefit or may be causing harm.

The device comprises known and novel patient interaction (PI) units for monitoring MA, in combination with known and/or novel sensor units (SUs) for monitoring patient physical and/or mental wellbeing (PPMW) indicative of MA and/or ME, and configured for correlation thereof. Thereby a patient adverse event due to MA and/or ME can be correctly identified and addressed, or can be anticipated and forestalled, in novel manner.

The term "medication adherence" (MA) herein refers to medication-taking behaviour, more particularly the extent to which a patient takes medication correctly, as intended or prescribed, at the correct time and in the correct manner, for example the extent to which a patient understands and complies with medication-taking directions, monitors medication supplies remaining and reorders, and the patient's motivation for such behaviours and the like.

Conversely the term "non-adherence" (NA) herein, also termed non-compliance, refers to non-optimal MA, i.e. incorrect medication-taking behaviour, more particularly the extent to which medication is not taken or is taken incorrectly by a patient, for example taken at incorrect time or taken in incorrect manner (e.g. dose, time, frequency) e.g. over-medication or under-medication, supplies not monitored, poor motivation or patient is non-compliant.

The term "medication error" (ME) herein refers to an adverse medication event causing a change, e.g. deterioration in PPMW. ME includes non-optimal MA i.e. NA as herein defined, medication ineffective or including in the case that a condition is progressing and there is a need to increase or alter medication, medication is incorrect, non-optimal or not suitable for reason of any of past abnormal response or adverse reaction to medication including side effects, dependence, withdrawal and the like, or otherwise unsuited to the patient for reason of comorbidity, and/or lifestyle preference e.g. management of side-effects, mode or timing of administration. Identification of ME is cause for urgent medication review.

Accordingly the disclosure herein relates to MAM wherein MA is monitored both directly, by PI and reporting, and indirectly by PPMW as a marker or indicator of MA and/or ME. The terms "MAM", "medication adherence monitoring", "medication and monitoring and "medication administration monitoring" herein are used interchangeably unless the sense dictates otherwise.

There is a balance to be struck in a patient undermedicating, and suffering symptoms of a condition, and overmedicating, and suffering adverse effect or side effects of medication such as mood, drowsiness, anxiety or feelings of being rushed or crowded. It can be hard to assess where a patient sits on this curve, and the patient may not communicate this.

The MAM device herein is primarily configured for improving patient MA practices and patient MA motivation, more particularly for monitoring MA which is communicated by PI, and for monitoring MA which is not communicated by the patient by means of patient markers of MA, e.g. which manifest in PPMW.

The device is moreover configured for monitoring ME, more particularly monitoring patient marker(s) of ME, e.g. which manifest in PPMW.

There is herein provided a wearable device and method configured to access digitised medication data, including digitised medication dose charts personal to a patient wearing said device and to provide for visual and/or audio MA interaction by a patient, responsive to said data e.g. configured to present visual and/or audio medication dose reminders, and to provide for visual and/or audio MA interaction by a patient (PI), responsive to said reminders, more particularly by access to and interaction with a MAM centre (MAMC). The device moreover operates with voice recognition features configured to use voice recognition as a health indicator.

More particularly, the device comprises an interactive visual display unit (VDU) and/or interactive audio platform (AP) for bidirectional MAM dose and response function, i.e. medication reminder and response, engaging both HP, e.g. directly or indirectly, and patient, more particularly for visual and/or audio communication to patient, e.g. from a MAM centre including database and/or HP and by PI. The device provides guaranteed delivery of reminder, and patient engagement in the reminder process. In embodiments the AP provides monitoring function, more particularly patient voice monitoring configured for voice analysis as an indicator of MA and/or ME. Embodiments of the device comprising an audio-visual platform, are configured for additional visual analysis, more particularly patient visual interaction, facilitating correlation with voice analysis for enhanced monitoring. Moreover the device is configured to access, i.e. to generate, patient data such as patient MA and/or ME data including data relating to patient biomarkers and/or real time patient biometric data, as an indicator of MA and/or ME by means of dedicated, i.e. integral, sensor unit(s) (SUs) such as biomarker SU(s) and/or biometric SU(s) and/or connectivity with external sensors. SUs for example include pulse rate and sleep sensors or monitors. The wearable device moreover comprises universal wireless connectivity, more particularly 24/7 connectivity from any point on the globe, in particular satellite connectivity. The device is configured for remote monitoring of said MA interaction, voice analysis and patient MA and/or ME data by a MAMC.

The wearable device herein is disruptive in that it is configured for real time monitoring, identifying incorrect behaviours such as patients taking too little or too much medicine, at incorrect times, any of which are potentially unsafe, identifying patients at risk of NA and/or ME and/or in need of urgent review, and directing HP, i.e. clinic, staff and facility time to best effect.

In embodiments there is herein provided a personal wireless digital MAM device (MAMD) for a patient in receipt of medication treatment, said device comprising; a wireless communications unit (WCU) for accessing at least one wireless communications network; a power supply unit (PSU); a processing unit (CPU); and a memory unit, configured to access remotely and store, data relating to a personalised medication treatment program, said data including digitised medication dose and/or monitoring charts; said device comprising a MAM unit (MAMU) which comprises at least one of an interactive VDU and an interactive AP, configured for bidirectional visual display and/or audio MA interaction, between the patient (PI) and a remote MAM service provider (MAMI) in relation to said digitised charts; wherein said remote MAM service provider interaction is by means of a MAMC comprising a local or remote database and optionally additionally comprising one or more MAM personnel interfaces, such as one or more HP interfaces, and combinations thereof; wherein the device is wearable by the patient, comprising at least one attachment selected from a patient-attachment for attaching to a member or body part of said patient, and a wearable-attachment, for attaching to an item of wearing apparel, or to a further wearable digital device and the like. The device may be adapted for daytime wearing and/or night-time wearing, on or about a person of the patient, wherein the MAMU is e.g. detachable from or integral with the attachment. Preferably the device is configured for connecting to at least one satellite communications network and/or the WCU provides 5G connectivity. Preferably the interactive AP comprises a speaker unit (SPK) and a microphone unit (MIC), whereby the device is configured to transmit patient interaction (PI) data and signals for the performance of voice recognition analysis, for example detecting changes in voice for determining PPMW, i.e. as a marker or indicator of MA and/or ME. Preferably the device incorporates additional patient data collection including biomarkers and biometric patient data, or MA and/or ME sensors therefor, for correlation with MAM data, such as sensors selected from movement sensor, heart rate monitor, body temperature monitor, hydration monitor, oxygen saturation monitor or the like. Said sensors or monitors are adapted to monitor markers of PPMW, e.g. sleep, drowsiness, steps, mood, pulse rate, ECG, hydration, $O_2$ saturation, $CO_2$ levels, voice changes and the like. The device may comprise a docking unit or datalink providing for datasharing. Preferably the device is a short range device (SRD), more particularly comprises connectivity for short-range short-wavelength radio frequency (SR-RF) communication, i.e. is SR-RF enabled, more particularly for nanonetwork or nanoscale network communication, near-field communication (NFC), wireless body area network communication (WBAN) or wireless personal area network (WPAN) communication both including wireless infrared communication, wireless USB, Bluetooth™ or ZigBee communications. In embodiments the device includes an identification unit (IDU). The device configured to transmit biometric data and/or voice data for analysis is competent to indicate the device not being worn or being worn by a person other than the patient.

Preferably the wearable device is configured for "real time" monitoring information (e.g. pulse rate, drowsiness, voice changes, ECG etc.) configured to reduce harm to patients from ME including medicines adverse effects, relating prescribing decisions to biomarkers of remote monitoring for which the medication is being taken, and/or monitoring the aforementioned markers as physical health aspects of social prescribing, for comparing with addition of or changes in medication.

Preferably the wearable device is waterproof, robust, and/or lightweight, is configured to provide a simple interface, i.e. amenable for use by patients of all ages and abilities, and/or comprises a global connection, long battery/low power usage, simple charging, voice analysis interaction e.g. to pick up side effects of medication, overmedication, potential problems e.g. stroke, depression, drowsiness, heart rhythm/bradycardia/ECG disturbance and complications with medications such as beta-blockers and antipsychotics such as clozapine.

In embodiments there is provided a wearable MAM device for wearing by a patient in receipt of medication, comprising an operating unit (OU) which comprises: a WCU e.g. comprising an interface for accessing at least one communications network and communicating data and/or signals between the device and a remote address, more particularly between the device and a MAM centre (MAMC); a CPU; a memory unit and one or a plurality of peripheral interface(s) with a plurality of input peripherals configured to send data and/or signals to the OU and a plurality of output peripherals configured to receive data and/or signals from the OU; for example configured to access, e.g. remotely and/or locally, and store, e.g for processing and output or communication thereof, data and/or signals relating to MA and/or ME, including a personalised medication program, such as data relating to digitised medication dose and monitoring charts; and further comprising the plurality of input peripherals and the plurality of output peripherals comprised in a MAM unit (MAMU) which comprises:

an interactive visual display unit (VDU) comprising a visual display (VD) and a VD patient interaction (PI) tool (VDTOOL); and/or an interactive audio platform (AP) comprising an audio output unit, herein speaker unit (SPK), and an audio PI tool, herein microphone unit (MIC), configured for VD and/or audio MA interaction of the patient (patient interaction, PI) and of the remote address (MAM interaction, CI), i.e. bidirectional interaction and generating PI data and/or signal(s) relating to MA, wherein each of VD and SPK comprises an interface for receiving data and/or signals from the OU and each of VDTOOL and MIC comprises an interface for sending data and/or signals to the OU; and one or more sensor unit(s) (SU(s)), configured for detecting changes in PPMW as a marker or indicator of MA and/or ME, more particularly comprising at least one biomarker SU and optionally at least one biometric SU, configured for sensing patient biomarker(s) and optionally patient biometric marker(s) or indicator(s) of MA and/or ME and generating patient physical and/or mental wellbeing (PPMW) data and/or signal(s) indicative of MA wherein each SU comprises an interface for sending data and/or signals to the OU;

and comprising one or a plurality of attachment unit(s) (AU(s)) selected from a patient AU configured for wearing of the device on or about a member or body part of said patient, and an apparel AU configured for attaching the device to an item of patient apparel, such as clothing, accessories such as a further patient device and the like.

"Data" or a "signal" herein may be data or a signal which is in electronic and/or optical and/or electromagnetic radiation form and/or is capable of electronic and/or optical and/or electromagnetic radiation transmission and/or reading.

The term "a plurality" of any referenced item herein refers to any whole number integer value more than one and up to a maximum value which will be apparent to one of ordinary skill in the art or a value of "all". A plurality may be two or may be three to six such as four or five, or may be seven to ten such as eight or nine or may be a whole number integer in excess of ten.

An interface herein is hardware comprising an input or output or a direct and/or indirect connection or coupling of an input and an output, i.e. I-O connection or coupling, more particularly comprising electrical and/or optical circuitry and/or a wireless interface such as a remote network communications interface such as WCU as hereinbelow defined or an SR-RF interface comprising a suitable antenna, transmitter, receiver or transceiver. Electrical and/or optical circuitry herein is suitably selected from pins, tracks, traces, wires, waveguides and equivalents as known in the art and combinations thereof. An I-O connection may additionally comprise one or a plurality of placed components such as processor(s), bus(es), SR-RF modules, antenna(e), transmitter(s) and receiver(s) and the like. Input(s), output(s) and I-O connection(s) are suitably comprised in one or a plurality of integrated circuit(s) (IC(s)). An SR-RF antenna, transmitter, receiver or transceiver is suitably a placed component in an IC or is comprised in a SR-RF IC or SR-RF chip or module.

A MIC herein may be variously referred as an acoustic sensor, microphone, voice sensor or vocal sensor unit which terms are interchangeable. In embodiments one or both of MIC and an SU is an acoustic sensor unit (ASU or AS) configured to generate high fidelity patient audio signals in the frequency range of human speech and/or human vocalisation, for voice and/or vocal analysis indicative of MA and/or ME. Suitably MIC comprises one or a plurality of ASUs, microphone units or arrays which is/are directly or indirectly responsive to voice or vocalisations or marker thereof such as cough, movement or vibration, preferably comprises at least one high fidelity ASU or microphone unit (HiFiMIC). A HiFiMIC is characterised by high fidelity in the frequency range of human speech or vocalisation, preferably configured to generate a high fidelity audio signal for example for voice analysis and remote monitoring, more particularly to transmit audio PI or patient MA communication for voice analysis and detecting changes relating to PPMW, as a marker or indicator of MA and/or ME.

In embodiments one or more SU(s) herein comprise a sensor material or a sensor system comprising a combination of material(s) which is a smart material or a smart system which is responsive to a patient stimulus by a response comprising a reversible measurable material property change. A sensor material or system may be coupled to or integrated with one or more components for outputting the response as data and/or signal(s), for example the sensor output may be in the form of electricity or electrical energy or of a measurable material property. Preferably the response is self-powered or is powered by the stimulus, more particularly the sensor material or system is an active, most particularly an active electrical, sensor material or system. An active sensor is configured to generate a stimulus response in response to a patient stimulus which serves as the output signal without the need of an additional energy source. An electrical sensor is configured to generate an electric current in response to a patient stimulus.

The SU may comprise a component such as a charge amplifier such as a digital signal processor (DSP) or a transducer configured to convert a stimulus response into data and/or signals.

Suitably the input peripherals comprise VDTOOL, MIC and SU(s) and each thereof comprises an interface for sending data and/or signals to the OU. In embodiments the input peripherals are comprised in a triangulation source environment of the MAMU configured to send data and/or signals relating to and indicative of MA to the OU from at least three sources including PI, patient voice and/or vocalisation and PPMW for local or remote triangulation thereof. Suitably the output peripherals comprise VD and SPK and optionally additionally one or a plurality of SU(s) as input/output peripheral(s) and each thereof comprises an interface for receiving data and/or signals from the OU. In embodiments the output peripherals (and input/output peripheral(s)) are comprised in a triangulation control environment of the MAMU configured to receive data and/or signals relating to MA from the OU for direct or indirect control of said triangulation source environment.

Preferably OU and MAMU are comprised in one or a plurality of patient AUs. In embodiments the device is an embedded system, more particularly an embedded integrated system, wherein the AU is a housing which houses a computer, herein the OU, and peripherals, herein MAMu units, more particularly is a communication and/or network housing which houses the OU and peripherals and comprises communication and/or network hardware, whereby the device is competent to perform a specific task, herein MAM, enabled by the housing of peripherals in communication with the OU and in communication with a patient wearing the device. The device comprises the necessary software for the performance of the task. Preferably the AU(s) is a shaped housing, more particularly enables the attaching of the device to the patient, the integration, connectivity and/or networking of units and of units with the patient.

The remote address is suitably a MAM centre (MAMC), comprising one or a plurality of servers, databases and/or personnel interfaces such as HP interfaces and the like.

In embodiments the device is partially or fully self-powered or self-sustained, wherein the device comprises one or a plurality of power supply unit(s) (PSU(s)) comprising one or a plurality of power supplies selected from an energy harvesting unit (EHU) configured for harvesting energy from one or more energy sources of the patient and/or of the patient's environment, and a wireless energy receiver (WER) configured for wirelessly receiving energy from a wireless energy transmitter (WET), and a combination thereof, and one or a plurality of energy storage cell(s) (ESC(s)) selected from a capacitor, supercapacitor and rechargeable battery and combination thereof, for storage/accumulation of energy. An EHU is suitably configured for harvesting biomechanical or mechanical energy such as vibrational or kinetic, acoustic or thermal energy such as kinetic or kinetic potential energy, solar or internal light energy, RF energy, ionic such as salinity gradient energy, electric potential and/or chemical energy and combinations thereof or energy form disclosed herein. A WER is suitably configured for receiving energy transmitted by electromagnetic (radiowave, microwave, infrared or visible light), electric, or magnetic field from a wireless energy transmitter (WET). In embodiments a plurality or all of PSUs and/or ESCs make up a central or distributed power supply system (PSS) and/or energy storage system (ESS). In embodiments the one or a plurality of AU(s) is a power supply and/or energy storage housing which houses the PSS and/or ESS and comprises embedded power supply and/or embedded energy storage hardware, whereby the device is competent to perform a MAM task. More particularly a PSS and/or an ESS are a power supply environment and/or an energy storage environment of an AU.

In embodiments one or a plurality of PSUs and/or ESCs are local PSUs and/or local ESCs. Preferably a PSU or a PSS comprises a combination of two or more EHU(s) configured for harvesting different energy forms. In embodiments an EHU comprises a smart material or smart system comprising a combination of materials which is responsive to a stimulus of the patient or the patient's environment by a response comprising a reversible material property change, more particularly which is ferroelectric, piezoelectric, triboelectric, thermoelectric, pyroelectric, photovoltaic, magnetostrictive, electromagnetic or the like.

In embodiments a PSU comprises a power management IC (PMIC) for conversion of harvested and/or received energy such as unregulated voltage and current into regulated energy for supply to one or a plurality of load(s) (a unit or part thereof) and for storage, more preferably together with circuits for protecting the load(s) and ESC(s). A PSU and/or PSS may comprise a plurality of power supplies connected in series and/or in parallel. In embodiments a PSU and/or PSS comprises a plurality of power supplies in parallel and a management controller connected to the plurality of power supplies by a management bus interface. In embodiments a PSS comprises a plurality of PSUs and a controller and a serial bus which connects the PSUs in a daisy chain, wherein the controller is connected to first and last ones of the PSUs by the serial bus.

The device is configured for generation of PI data and/or signals and PPMW data and/or signals. More particularly the device is a wearable MAM triangulation device for generation of VDTOOL data and/or signals, MIC data and/or signals and SU(s) data and/or signals, e.g. data and/or signals relating to medications taken, voice or vocal responses, and biomarker(s) and/or biometric marker(s), for local and/or remote triangulation thereof. Triangulation herein employs multiple sources of MA data and/or signals and multiple approaches to monitoring MA to enhance the accuracy and speed of monitoring MA and of identification of deviations from normal, or to identify indications of NA and/or ME, more particularly in VDTOOL data and/or signals, MIC data and/or signals and/or SU(s) data and/or signals, as a marker of MA.

In embodiments the input peripherals comprise VDTOOL, MIC and SU(s) and are comprised in a triangulation source environment of the MAMU configured to send data and/or signals relating to and indicative of MA to the OU from at least three sources including PI, patient voice and/or vocalisation and PPMW for local or remote triangulation thereof, and the output peripherals comprise VD and SPK and optionally input/output peripheral(s) SU(s) are comprised in a triangulation control environment of the MAMU configured to receive triangulation control data and/or signals relating to MA from the OU for direct or indirect control of said triangulation source environment, and/or for controlling SU data and/or signal output.

Triangulation control data and/or signals may comprise an MA triangulation routine, selected from a routine for the performance of an MA triangulation source task, such as a status routine including: VD display of fields for PI input, SPK output of invitation for PI response such as greetings or questions and/or reading from an SU; or threshold routine including identifying input peripheral data and/or signals comprising a threshold MA value or identity and instructing a status task to control the generation of MA data and/or signals from same or different input peripheral for example for validation or dismissing and signing off of threshold MA value or identity; or escalation routine including identifying input peripheral data and/or signals comprising an escalation MA value or identity and comparing with presets to identify MA monitoring action required and instructing a monitoring action task, for example MA reminder together with VD display of PI input fields and/or SPK output of invitation for PI response; or intervention/alert routine including identifying input peripheral data and/or signals comprising an intervention MA value or identity and comparing with a plurality of preset values (presets) to identify intervention/alert required and instructing a corrective measure task. Corrective measures may include alerting the patient and/or MAMC and instructing remedial action such as medication intervention and/or urgent monitoring appointment with HP. Triangulation systems and methods are various and known in the art. Preferably local and/or remote triangulation herein is with use of one or more triangulation algorithms.

In embodiments one or a plurality of SUs herein is an input/output peripheral configured to send data and/or signals to the OU and to receive data and/or signals from the OU, more particularly to send PPMW data and/or signals and to receive control data and/or signals.

In embodiments the device is a MAM triangulation device configured for local triangulation or triangulation control. More particularly the MAMU is comprised in an intra-responsive triangulation environment comprising a responsive control unit (RCU) comprising a controller, a memory unit, a PSU or being comprised in a PSS and one or a plurality of peripheral interfaces for input peripherals comprised in the triangulation source environment and for output peripherals and input/output peripherals comprised in the triangulation control environment as hereinbefore defined, and wherein the RCU is configured to receive data and/or signals relating to and indicative of MA from said triangulation source environment of the MAMU and to generate and send responsive triangulation control data and/or signals to said triangulation control environment of the MAMU. Control data and/or signals suitably comprise MA triangulation routines. An intra-responsive triangulation environment is suitably a communication environment comprising electrical and/or optical circuitry and/or SR-RF interfaces networking each peripheral with the RCU. An RCU may be a central RCU or a distributed RCU, may comprise one or a plurality of processors, such as microprocessor(s) or microcontroller(s) (MCU(s)) and/or may be comprised in OU or in MAMU or in communication with OU or MAMU. More particularly VD, SPK and SU(s) input(s) and VDTOOL, MIC and SU(s) outputs are comprised in a communication environment with respective outputs and inputs of the RCU. The responsive communication environment may comprise bus-based communication, more particularly a bus architecture or may comprise interconnection-based communication, more particularly a network architecture. Such hardware enables local triangulation by the RCU, configured to identify deviations from normal, more particularly in respect of VDTOOL data and/or signals, MIC data and/or signals and/or SU(s) data and/or signals, as a marker of MA, and to initiate a MA triangulation routine output to VD, SPK and/or SU(s).

Such hardware enables any one or more of VD, SPK and SU(s) to be responsive to any one or more of VDTOOL, MIC and same or different SU(s), more particularly to be responsive to a control signal initiated by output therefrom, such as a status, threshold, escalation or alert control signal.

Preferably therefor units of MAMU are inter-responsive, more particularly are configured for initiation or activation of a unit or routine in response to certain outputs from a same or different unit. Accordingly such hardware is configured for generation of triangulation PI data and/or signals, voice data and/or signals and PPMW data and/or signals for local or remote triangulation thereof, more particularly for generation of triangulation VDTOOL data and/or signals, triangulation MIC data and/or signals and triangulation SU(s) data and/or signals, e.g. medications taken, voice responses, and biomarker(s) and/or biometric marker(s) data and/or signals. Triangulation data and/or signals are generated for the purpose of triangulation, i.e. checking for accuracy and/or inconsistencies and the like in data and/or signals generated by same or different input peripherals.

SU herein suitably comprises a sensor selected from sensors of body vitals and sensors of other markers of PPMW, more particularly selected from cardiovascular, respiratory and circulatory, sleep physiology, metabolism including chemical, skin physiology, movement, mood, activity sensor and the like, or any SU herein or a biometric sensor as a sensor of the device not being worn or being worn by a person other than the patient, more particularly including body temperature sensor, heart rate (HR) or pulse rate sensor such as ECG or pulse oximeter, blood pressure (BP) sensor, respiratory rate (RR) sensor, oxygen saturation sensor ($SpO_2$) or $CO_2$ sensor, pH sensor, hydration sensor, electrodermal activity sensor (EDA), accelerometer, height sensor, sleep sensor, appetite sensor such as a calorie counter, step counter, and a combination of two or more thereof, more particularly including one or two or a plurality of vitals sensors.

The terms "marker" or "indicator" or "parameter" herein refer to a medical sign or objective indication that can be observed, accurately and reproducibly, from outside the patient and indicates the state of the patient, for example body temperature is a marker of fever, blood pressure is a marker of stroke risk or may be a marker of a psychotic event. A biomarker or indicator indicates a state of PPMW and may be a physiological marker or a behavioural marker. A biometric marker indicates a state of the wearer's identity, i.e. identifies the wearer or may be a behavioural marker herein. There may be several choices of marker for the same state of the patient, for example BP and pulse are both markers of cardiac function. There may be several choices for observing a marker, herein "parameters", for example body temperature is traditionally observed by recording temperature of one of several parts of the body including mouth, ear, forehead, skin and is herein preferably recorded by contact, radiation or optically with a patient limb or part thereof.

Preferably SU herein is configured for or tuneable to a parameter of a marker that indicates MA or ME, more particularly a critical parameter, e.g. which is real-time, accurate and/or can be observed by contact with the patient by means such as physical contact, electromagnetic such as optical or by a field effect such as effect of an electrical, magnetic and/or radiation field. A marker or indicator is suitably observable by one or more parameters indicative of presence, absence, event, pattern such as frequency, strength or dimensions e.g. volume, pressure, or the like and may be an absolute or relative value or quantity or the like. E.g. volume and pressure may both indicate a dimension. A "critical" parameter is a parameter suitable for MAM herein. The device suitably comprises SU(s) configured for sensing a critical parameter.

An SU herein is preferably an auto-sensor, i.e. an auto-controlled sensor, e.g. is controlled by a controller comprised in the SU and/or RCU and may be centrally and/or remotely controlled, e.g. by OU and/or MAMC.

In a further aspect there is provided a device or a kit for a device herein, comprising a plurality of modules and one or more (patient) AUs therefor, wherein a module comprises any one or more units or part(s) thereof and may be wearable independently of one or more additional modules, comprising a patient AU herein or is mountable on a wearable AU herein, and wherein the module or units comprised therein comprise a docking point or portal or a datalink or interface for datashare with one or more additional modules, comprising electronic or optical circuitry portal or SR-RF interface.

In a further aspect there is provided a wearable component of the device herein, e.g. comprising one or a plurality of unit(s) and/or part(s) thereof and/or modules. In an embodiment, a wearable component comprises the OU, interactive VDU and/or interactive AP and optional biometric SU(s) and omits biomarker SU(s) and voice analysis functionality, such as HiFiMIC. In an alternative embodiment a wearable component comprises SU(s) and AP or part thereof including HiFiMIC together with voice analysis functionality, and the device omits the interactive VDU. In an embodiment a device herein is a modified smart watch.

Preferably a device, AU, unit, module or part thereof is flexible such as conformable. This has advantages including comfort (24/7 wear), robust, lightweight, waterproof sealed device, conformal contact with patient skin for optimum sensor operation and/or convenience of manufacture, e.g. by extrusion, 3D printing or the like.

In a further aspect there is provided a device or kit or component herein for use in healthcare, more particularly in MAM, more particularly in relation to medication for one or more medical conditions requiring treatment by medication. A medical condition is for example any condition listed in the International Classification of Diseases. Particularly significant conditions are e.g. chronic conditions or disorders such as medication for diabetes, pulmonary and cardiac including COPD, cancer, mental health including psychiatric such as schizophrenia, palliative care, transfer therapy, contraception, neurology and the like and combinations with other medications. The device functionality is specific. i.e. bespoke to MAM and monitoring ME. In embodiments the device functionality is limited to communication with MAMC including HP and MAM databases. In embodiments the device is configured for operating exclusively software relating to a patient's healthcare and is locked against a patient introducing any other software. The device is thereby simple to operate, and has numerous additional benefits including minimal power consumption/usage.

In a further aspect there is provided a method for the manufacture of a device herein.

BRIEF DESCRIPTION OF THE DRAWINGS

The additional details, features, and advantages of the present disclosure are described in detail from the following description for the exemplary embodiments described with reference to the corresponding drawings, wherein:

FIG. 1 demonstrates a problem in current practice among self-administering patients;

FIGS. 2a to 2d illustration configurations of a wearable device herein;

FIGS. 3a and 4b illustrate embodiments of the wearable device herein with inset interactive VDU and/or AP;

FIGS. 5a and 5b illustrate the units comprised in a MAM device herein, additionally in FIG. 5b the flowscheme of MAM in the device;

FIGS. 6a and 6b illustrate flowschemes for MA reporting herein;

FIG. 7 illustrates a distributed computing environment capable of operating the method herein;

FIG. 8 illustrates a patient id for use with a device herein.

DETAILED DESCRIPTION

Marker of MA

The device promotes MA best practice. The act of MA input lies with a patient which empowers the patient to influence or communicate information which might affect a decision on medication and which can affect a health outcome. The interactive device herein enables improved engagement by a patient. This has been shown to directly change patient behaviour to MA. PI in response to MA reminder notification over time provides markers of MA. In embodiments the device comprises a marker-of-self (MoS) (micro)processor or MCU which may be comprised in the OU or MAMU comprising peripheral interface(s) with input peripheral(s) VDTOOL and optionally additionally MIC and output peripheral(s) VD and/or SPK configured to receive MA data and/or signals from VDTOOL and to send quantifiable MoS data and/or signals to VD and/or SPK, wherein the device is configured to present, i.e. display or emit a visual or audio quantifiable MoS to the patient, more particularly a quantifiable marker-of-self of MA derived from PI data, e.g of medication actually taken, preferably a quantifiable performance MoS. A performance MoS may include qualitative or quantitative MA performance data, i.e. medication taken, by parameter or filter such as cumulative or change, %, numerical, fractional, traffic light score etc., period (daily, weekly etc.), or qualitative parameter (poor or good performance). For example, a patient may receive a rating of % of medications taken, and/or % improvement on the previous day, and/or comparison with target not met, achieved or surpassed, by how much. A performance MoS may be calibrated to a target performance and may include a motivational message reflecting the patient's performance against the target. A patient may set the target. The device may be configured to present a motivational message, for example congratulatory or motivating to improve. A patient learns that a higher MA performance MoS, e.g. 10%, gives exponential improvement in health outcome, e.g. 80% MA over 70% MA.

A MoS or performance MoS may be a marker of patient's motivation for MA behaviours, i.e. motivation to take medication, e.g. derived from a behavioural SU, such as a behavioural MoS, and/or a biometric SU, such as a biometric marker-of-self, including mood sensor, sleep sensor, appetite sensor, activity sensor counter, and a sensor of the device not being worn or being worn by a person other than the patient, such as a motion sensor, iris, face or fingerprint recognition sensor. The device and method herein provide a synergistic effect of increasing MA and increasing patient motivation to take medication as intended, and confidence in medication, i.e. improving any one thereof further improves the other thereof, further increasing MA.

Personalised Medication Program

Digitised medication dose charts include for example "on-demand", "scheduled" or "reminder" and/or "MA" charts. PI includes dose and status response e.g. reporting and may be real time. PI may be on-demand interaction and/or responsive interaction, e.g. in response to menu options or to a scheduled dose reminder notification. Transmission of PI to a MAM service causes update of medication status.

"On-demand" interaction includes "just-in-time" reordering of medication stocks, addressing wastage of medication, i.e. medication herein provided to a patient and part or all thereof unused for MA reason, e.g. NA or change or correction of prescription.

Medication Alerts/Notifications

The MAM device herein is configured for access to digitised medication reminder charts and provision of an interactive dose reminder application. These resources enable HP to set up medication reminder alerts or notifications (MRAs) and a patient to respond.

The wearable device herein is configured to display visual and/or issue audio e.g. voice MRAs and to receive patient response. Visual and audio MRAs may be in parallel.

For example: "Dawn Price, your breakfast medication is now due:

Name/Form/Strength/Dose/Quantity" Options Y/Taken, N/Not taken, I/Ignore (which prompts a later reminder), E/Stop interaction.

Control over alerts or notifications remains with the patient but with monitoring in place to provide a clinical intervention safety net for patients that stop interaction or routinely reply N. Alerts or notifications may include reminders to cease smoking, take exercise, follow diet etc.

Alerts and/or input may also take the form of stock-taking alert or patient-initiated on-demand medication or reorder of a patient's medication reserve. This enables monitoring of on-demand medication, or a "just in time" approach to reorder and dispensing new medication stocks, for addressing reduction in medication waste. This is particularly beneficial in case of medication which is regularly changed, or taken as required, and enables a patient to self-manage medication stocks. For example, medications to be taken when symptoms demand, such as sleeping tablets, or salbutamol inhaler in case of patents suffering COPD or bronchiectasis, need only be restocked when needed.

The device herein suitably comprises a timing unit, such as a GPS receiver, configured to date and time stamp MAM interaction and to schedule medication dose reminder notifications according to said digitised charts, for operation within and between time zones. In embodiments therefor a medication notification is scheduled by elapsed time since last dose and/or by absolute time.

In embodiments the device includes an identification unit, for example configured to recognise a personal QR code and identity stamp MAM interaction or communication. A wearable identifying QR code plate may be provided in the device or in combination with the device, for example the lightweight aluminium or steel QR code bearing "My SOS" plate. The identifier may code to the patient or the SIM(s), and to links to patient health records, health passport and the like.

MAM Centre (MAMC)

Device hardware herein is configured for interaction with and monitoring by a remote address comprising a MAM service (provider) or MAMC, e.g. for patient support and maintenance of the device. MAMC interaction herein is conveniently by means of a local or remote database and optionally additionally one or more MAM personnel interfaces, such as one or more HP interfaces, and combinations thereof.

A MAMC interface such as an HP interface may be provided on any suitable computing system environment or configuration, device or unit such as a mobile device or stationary device, for example a mobile phone, smart phone, tablet or laptop device, personal computer, desktop computer, server computer, multiprocessor system, microprocessor based system, set top box, programmable consumer electronic device, network PC, minicomputer, mainframe computer, public access terminal, server or cloud-based server or distributed computing environment containing any of these systems or devices, and the like.

Attachment Unit (AU)

A device herein is sized and shaped to be worn about the person of a patient. In embodiments the wearable device is water resistant or water-proof, for example the device or a unit or module or component comprises an integral or detachable water resistant or water proof shield such as a cover or casing, membrane, gasket or the like or a combination thereof. Any one such shield may shield the interactive AP or part thereof, more particularly the MIC(s) and/or SPK(s). Preferably the AP or a component such as MIC(s) and/or SPK(s) comprise a gasket, more preferably configured at an aperture. This is configured to prevent ingress of fluid, fine particles or the like, such as water, steam and dust. A shield may be integral with the device, for example a device comprising embedded units mounted in a moulded, e.g. silicone, mounting or may be separate for example a clip-on shield for the device or a part thereof.

In embodiments herein, a wearable device may comprise detachable units or modules which are water sensitive, for example detachable AP or part thereof, e.g. MIC or SPK.

In embodiments a device herein comprises data-share, which may be by SR-RF interface as hereindefined or data and/or signal transfer unit such as Bluetooth™ or other wireless or wired connectivity to a separate portable or wearable module such as AP or part thereof, for example which may be worn or carried in or on an item of apparel.

In embodiments a MAMU herein is detachable from the AU, further comprising cooperating mountings on the MAMU and the AU, which may be mutually engageable, for example comprise a push-fit mounting.

In embodiments said AU is selected from a band to encircle a patient limb, member or body part or a further wearable device and a clip, clasp or cleat to attach to an item of apparel or a further wearable device and the like, such as a band or strap, wrist bracelet, ankle bracelet, neckband or necklace, tether, buckle, fabric clip, mating cleat attachment for attaching to a cooperating attachment on a further wearable device and the like. For example the device or a module or unit is selected from an ankle or wrist device such as an ankle or wrist band or bracelet, a jewellery item such as a necklace, pin, clip or brooch, ring or finger attachment, fob device such as a button hole fob device or tether-and-pocket-device such as a watch-fob style, pocket watch-style device and the like. A band may be deformable or resiliently deformable such as elastic. A band may be a closed loop such as annular or generally annular band or may be an elongate linear strap comprising cooperating secure, i.e. permanent, or releasable, i.e. temporary, fastenings or clasp or the like at ends thereof, optionally provided in two cooperating parts. Suitably a patient AU is configured for wearing in physical and/or optical contact with a patient, more particularly in physical and/or optical skin-contact. A patient attachment may be loose-fitting or close-fitting and/or configured for conformal skin contact for example may comprise stretchable, soft, porous and/or flexible polymer, hydrogel and/or elastomer materials. Alternatively or additionally, an AU may be adhesive e.g. configured for gentle adhesion to the patient body, suitably comprises a silicone based adhesive. Alternatively or additionally the AU may comprise one or a plurality of resiliently deformable flexible bands such as elastic silicon bands which may be secured to or comprise the OU and MAMU, for looping around a further wearable device, patient member or body part or item of apparel.

An AU herein comprises a surface enclosing a body. The surface comprises a display face and a contact face. A display face is configured to face outwardly to the patient body, e.g. for viewing of the VD, and includes side edges or faces. The contact face is configured to face inwardly to and to contact, e.g. physically or optically or acoustically or by radiation, and optionally to encircle or adhere to, a member or body part of the patient. Units or parts thereof herein may be comprised on or in the surface, such as the VDU and AP or parts thereof.

Embedded units or parts herein such as OU are embedded within the surface and/or body such as recessed or partially or fully enclosed. PSU(s) and SU(s) or parts thereof are comprised at or in a surface or embedded within the body, for example a solar EHU may be comprised in the viewing face; a thermal EHU or an SU may be comprised in the contact face.

A flexible, e.g. conformable or deformable or resiliently deformable AU is configured to conform to a shape of e.g. to loosely or closely contact, a contacted patient member or body part, suitably the AU or part thereof comprises a flexible, and/or adhesive, material. One or a plurality of units herein, including surface and embedded units or parts thereof are suitably flexible. A flexible VDU is e.g. an OLED (organic light-emitting diode) or OLCD (organic LCD), a flexible transducer (WCU, SU or PSU) is e.g. a flexible hybrid electronic circuit (FHE) and/or flexible smart material component thereof, and a flexible IC, memory cell, (micro)processor or the like, may comprise flexible printed circuitry employing i.a. optical polymer waveguides and/or conducting polymers printed on a flexible substrate such as a foil. An AU may alternatively be rigid. A rigid or flexible AU may be characterised by mechanical properties, e.g. may be cut resistant, solvent resistant, durable and/or heat resistant. AU may comprise an extruded or 3D or 4D printed flexible material which may be flexibly toughened or reinforced, for example comprising heat, solvent or cut-resistant material or filler or surface.

An AU surface and/or body herein may comprise same or different material or combinations of materials, e.g. may comprise different materials in a plurality of layers, zones or phases, for example selected from transparent, such as optically or acoustically transparent, cushioning such as gel (e.g. silicone), insulating, embedding, hydrophobic, adhesive and/or smart material and the like. For example, transparent, adhesive, cushioning or smart material may be comprised at the contact face or a part thereof, and/or optically or acoustically transparent material may be comprised at the viewing face or a part thereof and/or SR-RF insulating material and/or hydrophobic material may be comprised at the surface and/or electrically insulating (opaque), SR-RF transparent (lucent), embedding and/or smart material and combinations thereof may be comprised in the body.

Units herein are suitably mounted in a flexible polymer mounting, preferably a lightweight slim mounting with combined weight including units as hereinbefore defined of less than or equal to 200 g. Preferably the attachment or device comprises profile of less than or equal to 2 or 5 to 30 mm such as 2 to 10 or 10 to 20 mm. The AU is suitably comprised of materials such as moulded, extruded or 3D or 4D printed materials. Non-limiting examples include organic, inorganic and metals such as organic and/or inorganic polymers, copolymers, composite polymers, hybrid polymer composites with metals or non-polymeric organic or inorganic materials, polymer laminates and polymer blends or mixtures including interpenetrating networks (IPNs) and combinations thereof with alloys, ceramics, carbon materials e.g. carbon fibres and carbon nanotubes (CNT), which may be conducting and semiconducting and/or insulating organic or inorganic materials and metals. Non-limiting examples of flexible or semi-flexible material include silicone polymers, thermoplastic (TP) elastomers such as polyimides e.g. nylon and aramids (aromatic polyamides) e.g. Kevlar, polyurethanes (TPU), polyketones such as polyetheretherketone (PEEK) and polyetherketoneketone (PEKK), polyphenylsulphones (PPSU), polyimides (PI) such as polyetherimide (PEI) or Kapton™, polybenzimidazole (PBI), polyester (PE) and polypropylene, polycarbonates (PC) rigid or semi-rigid such as polystyrenes (PS) for example acrylonitryl butadiene styrene (ABS), acrylic styrene acrylonitrile (ASA) polylactic acid (PLA), polyethylterephthalate (PET) including glycol modified (PETG), co-trimethylene (PETT) and PETE and the like and combinations thereof. Non-limiting examples of opaque or optically clear materials include PS, PETT, e.g. as composite with optical sensors or as coloured component, warp resistant, shrink resistant such as PET, or having controlled shrinkage for embedding such as ABS or nylon. Non-limiting examples of hydrophobic material include polyethylene, polystyrene, polyvinylchloride, polytetrafluorethylene, polydimethylsiloxane, some polyesters, some polyurethanes, acrylics, and epoxies. Non limiting examples of filler, fibres, or domains or phases of a material, include carbon filler or fibres, e.g. Kevlar, CNTs including SWNTs, ceramic and may comprise domains or phases for example of smart material such as smart ceramic as hereinbefore defined, thermoplastic, such as an interpenetrating network (IPN) or phase separated domains of functional polymers.

Material may comprise a hybrid composite of a polymer and inorganic functional materials, e.g. non-limiting examples include carbon nanotubes, graphene, titanium dioxide, tin oxide and/or metal nanoparticles and the like and combinations thereof. Such hybrid composite polymers are responsive to electrical or pH stimulus.

A flexible polymer may be a composite material comprising a polymer reinforced with a ceramic, carbon or thermosetting polymer such as PEK reinforced e.g. may be cut-resistant, e.g. comprises material or a layer thereof selected from carbon fibre and aerospace materials including PEEK.

In embodiments an AU comprises electrical and/or optical circuitry and/or SR-RF communication environment housed in an AU material or substrate. More particularly AU comprises an environment or substrate for units of the OU and MAMU or parts thereof. An AU is suitably a functional environment, such as an energy storage environment, a power supply environment such as an energy harvesting environment, a communication (network) environment, more particularly an optically or electrically wired or wireless environment such as a network-on-a-chip, near-field-communication (NFC) or body area network (BAN) or personal area network (PAN e.g. Bluetooth) environment, or an intra-responsive MAM triangulation environment. For example the AU body and/or AU surface comprises wearable energy storage material and/or wearable PSS material such as energy harvesting material which is suitably stretchable and editable, suitably comprising electrode nanowires or nanofibers or core-shell yarn thereof, wearable SR-RF conducting material and/or wearable networked, preferably intra-responsive MAMU units, i.e. in electrical, optical and/or data and control signal network communication with or between a plurality of units herein. Such environment(s) is/are suitably distributed having regard to units of the device herein. Such material may be discrete and interconnected or continuous throughout the AU or a part thereof coextensive with a plurality of units. Such material may be provided in 2D or 3D or stacked array with units or may comprise units embedded therein.

In an embodiment there is provided a wearable embedded integrated MAM device comprising an OU as hereindefined and input and output peripherals comprising MAMU units as herein defined, housed within an AU which comprises a housing body and a housing surface having a viewing face and a contact face, wherein the VDU is embedded at and within the viewing face and the AP is embedded within the viewing face and/or the body and/or an AS is embedded at and/or within the contact face, and wherein one or a plurality of SU(s) are embedded at and/or within the contact face and/or within the body, wherein the AU provides an NFC, BAN or PAN environment and a plurality of units or parts comprise NFC, BAN or PAN interface and/or a plurality of units or parts thereof are comprised in an optically or electrically wired or wireless network or environment, more particularly a mixed output and input network or environment, most particularly a VD, SPK, VDTOOL, MIC and SU(s) network or environment comprising a system-on-a-chip housed within the AU body and surface. Hardware herein provides a device comprising a wearable wireless network-on-a-chip (NoC) comprising units embedded in an AU body comprising a shaped flexible, semi-flexible and/or rigid chip substrate, and/or within an AU surface and networked by wireless communication channels connecting units and ICs which may be chiplets or other chip architecture as herein defined.

Units & Modules

A unit herein may be defined by identity of hardware and/or software making up the unit, i.e. not by physical location thereof. Unit hardware may be co-located, grouped or distributed across a plurality of same and/or different units and/or modules. Unit hardware may be shared by a plurality of units. References to a "unit" or "U" include a collection of one or more parts or components (which may be provided at different locations). A unit herein suitably comprises one or a plurality of ICs (each) comprising a processor, memory and general purpose input/output pins (GPIOs) for peripherals (optionally integrated in a microprocessor), PSU or is comprised in a PSS, and may include a signal processor such as digital signal processor (DSP), analog, mixed signal or SR-RF signal processor, wireless interface e.g. SR-RF module and/or remote network communications module such as WCU and peripherals integrated on an IC or chip or microcontroller (MCU) or a system-on-a-chip (SoC), comprising a communications subsystem such as a bus architecture or switching fabric connecting on-chip components, or MEMS. An IC or SoC may be an application specific standard product (ASSP) or application specific integrated circuit (ASIC) or a field programmable gate array (FPGA). Peripherals include visual display, visual display input tool, speaker, microphone or sensor(s) and may be on-chip or networked. An SU suitably comprises an IC with on- or off-chip sensor, digital signal processor (DSP) core and on- or off-chip SR-RF module or transceiver or transmitter and receiver or wired interface or circuitry for input and output. In embodiments an SU is responsive and comprises transmitter and receiver or transceiver. Such hardware enables triangulation control of SU.

In embodiments a plurality of units herein is a wearable embedded wired or wireless network of units, e.g. network of unit ICs as hereinbefore defined and unit peripherals and may be a network-on-a-chip (NoC), optical network-on-a-chip (ONoC) or system-in-a-package (SiP, multiple ICs packed or stacked in a package). A chip substrate or package conveniently comprises or is provided by the AU body. Such hardware provides a plurality of units or parts thereof co-located on a single IC, which may be a 2D or 3D IC, or a plurality of ICs which may be stacked e.g. using package on package, comprised in a module or one of a plurality of modules. Packaging may be by flip-chip, wire bonding or wafer-level packaging or the like. Such hardware enables a compact assembly with minimal silicon infrastructure supporting rapid high performance and low power on-chip data and/or signal communication and/or networking.

Preferably the device herein is intra-responsive, i.e. MAMU units thereof are inter-responsive as hereinbefore defined. More particularly output peripherals such as VD and SPK and input/output peripherals such as SU(s) are independently responsive to input peripherals such as VDTOOL and MIC and same or different input/output peripherals such as same or different SU. In embodiments one or a plurality of VDTOOL, MIC and SU(s) is a sensor node, comprised in an inter-responsive input and output peripheral network and comprising a peripheral interface e.g. circuitry or an on-chip SR-RF module or chip. VDU and/or AP, more particularly VD and/or SPK or input(s) thereof may be responsive to SU(s) or output(s) thereof, and/or SU(s) or input(s) thereof may be responsive to VDTOOL and/or MIC or output(s) thereof and/or one or more SU(s) or input(s) thereof may be responsive to one or more other SU(s) or output(s) thereof. For example, a unit may be responsive to control signal(s) initiated by said output(s).

Suitably the intra-responsive device comprises a MAM environment comprising MAMU units, i.e. input, output and input/output peripherals and RCU. RCU may be a responsive control microprocessor and/or MCU comprising bus architecture, network architecture or the like, and may be comprised in OU or MAMU in communication with peripheral output(s) and/or inputs(s) and/or in I-O connections therebetween, and may take the form of an SoC. An RCU is suitably configured to receive PI, voice and/or PPMW data and/or signals from output(s) of VDTOOL, MIC and/or SU(s) and to generate and issue control data and/or signals, more particularly for input to an input of VD, SPK and/or SU(s), and/or to receive PI and voice data and/or signals from output(s) of VDTOOL and MIC and optionally additionally from biometric SU, and to generate and issue marker-of-self data and signals for input to VD input and SPK input.

Moreover SU(s) output(s) are in connectivity with input of OU and/or WCU for transmission of data and/or signals to a remote address, e.g. MAMU. Such hardware configuration ensures biomarker SU(s) output(s) to VD input and SPK input is limited to control signals such as requests for PI interaction in response to SU data such as threshold or escalation SU marker value detected. Thereby biomarker data including biomarker values is withheld from output to VD input and SPK input, i.e. there is no unprocessed channel for biomarker SU data or PPMW data output to the VD or SPK, and thereby to the patient. This hardware configuration ensures a simple interface and promotes MA, e.g. patient is not distracted, alarmed or misled by PPMW data.

A bus architecture or network architecture herein may include known bus architectures including known on-chip interconnect specifications such as Advanced Microcontroller Bus Architecture (AMBA), Advanced System Bus (ASB), Advanced Peripheral Bus (APB), High Performance Bus (HPB), Advanced eXtensible Interface (AXI), and the like, a crossbar communication architecture, or an intercommunication network e.g. peripherals may be comprised in a 2D or 3D network-on-chip (NoC or 3DNoC) or in an on-chip communication network such as an interconnect processing unit (IPU) or off-chip interface such as Hyper-Transport interfaces.

Such hardware enables inter-responsive units, e.g. input(s) of control signals responsive to output(s), more particularly as hereinbefore defined. I-O or I/O herein may refer to an input or output connection to an output or input and/or to an input which functions as an output, for example in a processor I/O interface.

Units are configured for low power usage. SU(s) are suitably configured for non-continuous monitoring of one or a plurality of markers and/or non-continuous output of SU data and/or signals relating to one or a plurality of markers, for example sensor operation or SU output may be in response to an event or event trigger, on a periodic timed basis and/or responsive to a control signal.

One or more units or parts thereof including circuitry such as input(s) and/or output(s) and I-O or I/O connections may be embedded in AU or in another unit, e.g. a biomarker or biometric SU may be embedded in VD or in VDTOOL, a piezoelectric or triboelectric EHU may be embedded in VDTOOL or in any part of the device which requires the application of pressure for operation. A unit or part thereof may be embedded beneath an optically or acoustically transparent part, e.g. layer for example an external surface of AU.

Units or part thereof including circuitry may be flexible or conformable and may comprise flexible material such as flexible or thin film or foil material or substrate, for example organic and/or inorganic materials and/or metals including electronically and/or optically insulating, semi-conducting and conducting polymers, non-polymeric inorganic materials and metals and smart materials and combinations thereof. Such hardware is conveniently provided by methods including 3D or 4D printing.

Preferably a unit integrates circuits and/or circuitry comprising electronic and/or optical circuits or circuitry provided as an IC. An IC herein may be an electronic integrated circuit (EIC) a photonic (optical) integrated circuit (PIC) or may be a combination thereof which comprises both electronic and optical circuits and may be a hybrid electronic and/or optical integrated circuit which comprises both printed and placed components. EIC include any electronic circuits and is not limited to silicon substrates. PIC include any optical circuits including optical waveguides, such as polymer waveguides. An IC may be comprised on a rigid substrate or may be a flexible IC (FPC) comprised on a flexible substrate, e.g. a thin film membrane comprising printed and placed components embedded in the membrane. Such hardware enables tight assembly providing connections in 3 axes and compact units and is moreover of advantage in a flexible AU herein. Placed components may include a transistor, processor, memory, transducer, such as EHU, sensor, DSP, smart system, antenna, transmitter, receiver, transceiver, microphone, speaker, pressure sensor for a VDTOOL or the like.

An input or output for any unit or part thereof is hardware, and suitably comprises electronic and/or optical circuitry including connectors for example selected from pins, tracks, traces, wires, pads, fibres, waveguides and the like and combinations thereof. An I-O connection may comprise circuitry and/or placed components, for example selected from a processor or microprocessor, bus, SR-RF antenna, transmitter, receiver, transceiver or module and the like. Output(s), input(s) and connections are suitably provided by rigid or flexible circuit board(s) (e.g. PCB(s)), flex circuits, integrated circuits (ICs including EIC, PIC or HE) or the like, which may include SR-RF ICs such as for SR-RF connectivity, e.g. NFC, BAN or PAN such as Bluetooth™.

One or a plurality of buses are for example an input output (I/O) bus or a network of high level and low level buses. A bus is any physical arrangement of circuit connections including pins, tracks, traces, wires, pads, fibres including optical fibres, waveguides and the like and equivalents and combinations thereof as known, as known in the art. Suitably a unit or part or connecting circuitry includes a processor for bus control. Such hardware enables imposing logical I-O connections for example including conditions under which respective units, modules or parts herein may output and input data and signals and respond to output data and/or signals. This may be useful to minimise power usage or to filter SU data e.g. by marker value or event. An I/O connection herein may be ascertained by inspection or by function, for example by detecting data or signals communicated between respective input and output, more particularly received by a unit or part from a different unit or part.

SR-RF Module(s) or Environment

In embodiments the device additionally comprises connectivity for SR-RF communication, comprised in the AU, OU, WCU, RCU and/or in one or more MAMU units or modules or part thereof, more particularly comprises one or more SR-RF transmitters and/or receivers or transceivers, more particularly SR-RF ICs or chips equipped with a radiowave antenna, transmitter and/or receiver and electronic circuitry providing digital communication between the unit or module and the device, for example a SR-RF, e.g. NFC, BAN or PAN e.g. Bluetooth™ IC chip or module. Preferably the device or a unit thereof comprises at least two SR-RF antenna and/or transmitters and receivers. Such hardware enables simultaneous transmission and reception.

An SR-RF chip comprises an IC, more particularly a microprocessor, memory and antenna. Such hardware enables a logic unit that makes decisions and provides memory to store data and needs power to operate. An SR-RF chip may be powered from a local or distributed PSU or from SR-RF energy radiated by an interrogator antenna. A part of the IC is dedicated to controlling power.

The antenna is suitably comprised of copper, aluminum, or silver strips, which may be a loop inductor, spiral, single dipole, two dipoles with one dipole perpendicular to another, or a folded dipole. The antenna length and geometry are selected to provide a required operating frequency, as known in the art, e.g. in a wavelength between 2.36-2.4 GHz (BAN), 2.4 and 2.483 GHz (WPAN e.g. ZigBee, Bluetooth), 13.553-13.567 MHz (NFC).

Chip and antenna are provided on a flexible or rigid plastic substrate. An example substrate is 100 to 200 nm thick, for example PVC, Polyethylenetherephtalate (PET), phenolics, polyesters, styrene, or paper.

In embodiments in a device comprising an intra-responsive MAMU, the AU comprises channels or regions of radiolucent material networking SR-RF chips comprised in responsive units, e.g. such as PET, Polypropylene (PP), Polyacetate (POM), Polycarbonate (PC), Acrylonitrile Butadiene Styrene (ABS), Polyamide 66P (A66), and ethylene propylene diene monomer (EPDM). In embodiments the AU surface comprises radiopaque material, e.g. in a device with no external MAMUs or modules.

The RF unit in the RCU or OU is suitably one or more RF chip readers and may be configured to transmit power to an RF chip in an SU. The transceiver antenna is preferably circular polarised or may be linear polarised. Circular polarised is suitable for interacting with antenna on multiple SUs. Linear polarised is configured for interacting with a single RF chip in one SU with which it is in alignment.

In embodiments a SR-RF environment herein is a passive reader active writer environment, i.e. one or a plurality of input peripherals are configured to transmit data and/or signals. In a preferred embodiment a SR-RF environment is an active reader active writer or peer-to-peer (P2P) environment, i.e. additionally the RCU is configured to read data and/or signals from and to write control signals to one or a plurality of input peripherals. WCU The WCU may comprise connectivity for a single, dual or a plurality of communication networks, i.e. comprises single, dual or a plurality of communication network interfaces and is preferably configured for simultaneous connection to at least two communications networks. A network herein includes backhaul. Connecting to two networks herein refers to two end-to-end networks. For the device herein to provide 24 hour communication from any location, access is required to a reliable communications network with universal coverage. Many inhabited rural areas lack reliable cell phone coverage and support a significant proportion of elderly patients. An interface herein is suitably for one or plurality of satellite communication or 5G, NB-IoT, or LTE networks and/or such as ultra high frequency (UHF) band networks and/or radio-communication networks in the VHF, UHF, L-, S-, C-, K- such as Ku- and X-band, Narrow Band Internet-of-Things (NB-IoT) 200 kHz or 700 MHz band or combination thereof.

An interface herein may comprise at least two of: a slot or aperture configured to receive a subscriber identity module (SIM) card or the like, an embedded universal SIM card (eSIM), a communications antenna and receiver, such as a communications satellite antenna and receiver, e.g. comprising a sleeve monopole and shorted annular ring (SAR) patch antenna or an IC chip equipped with an antenna and/or transmitter and receiver, such as communications satellite IC chip.

A satellite network herein may include high altitude satellites such as HAPS (high altitude pseudo satellites, and high altitude platform station), including high altitude geostationary orbit or geosynchronous platform stations or satellites (GEO, GSO), nanosatellites such as CubeSat or U-class (University class) satellites, geocentric orbit satellite e.g low, mid or high Earth orbit (LEO, MEO, HEO), or a combination thereof.

HAPS operate at much lower altitudes than satellites, to cover a small region much more effectively, e.g. deliver high-speed connectivity over areas up to 400 km, with bandwidth and capacity similar to a broadband wireless access network (such as WiMAX) and coverage area similar to that of a satellite. HAPS provide low telecommunications link budget (hence lower power consumption) and small round-trip delay. A CubeSat is a minituarised satellite for space research that is made up of multiples of 10 cm×10 cm×11.35 cm cubic units.

The device may be configured to connect to a network comprising HEO geo-stationary satellites or low earth orbit (LEO Cubesat) as backhaul to a HAPS platform, either directly using either NB-IoT or 700 Mhz spectrum. The device may therefore have connectivity for a macro site as control plane, e.g. satellite, such as HAPS network also communicating (e.g. using Cu or Ku Band) with the terrestrial network, such as via Satellite access point or either MNO Macro or Micro sites. This enables these endpoints to potentially communicate with the wearable device using 3.5 GHz or 26 Ghz, for example providing very high bandwidth and ultra-low latency when required. This would imply a 5G virtual network slice which could enable switching between network channels as required. For example, in ALERT mode a 5G slice may be instantiated to make use of available small cell and/or macro site coverage to provide real time feedback.

Sensor Unit

The terms sensor and monitor are interchangeable herein unless the sense indicates otherwise. SU herein comprises one or more sensors which may be one or more smart systems and may be comprised in one or more electronic and/or optical ICs (EIC, PIC and/or HE) and may comprise a processor which may be a microprocessor or MCU or the like as hereinbefore defined, or connectivity therewith for quantitatively digitising a transduced response, e.g. colour change or other stimulus response as hereinbefore defined. A sensor herein may be tuned or tuneable to one or more markers, and/or values or ranges of values of a marker, more particularly of a critical parameter thereof, for example a threshold value or range of values, e.g. corresponding to a status of a patient indicating ME and requiring monitoring, and/or an escalation value or range of values e.g. corresponding to status of a patient indicating ME and requiring escalation and possible intervention.

A sensor herein may be a monitoring sensor, configured for dynamic continuous or intermittent sensing, e.g. may provide a record of the marker or indicator sensed over time or may be status sensor, configured for indicating one or more patient statuses. SU output comprises data and signals relating to marker values or ranges of values, for example including absolute and relative values, severity, event or event trigger values, time profile, change therein or the like and combinations thereof.

A SU may comprise a microprocessor and memory which may be comprised in a MCU or the like, and may comprise an analogue to digital converter (ADC), DSP or the like for quantitatively digitising sensor response. A SU may be configured to compare sensor data and/or signals with a threshold or escalation value, and output data and/or signals exceeding such value, or may be scheduled to store sensor data and/or signals and to retrieve and output data packets at periodic intervals or according to a SU routine. Such SU operates with low transmission power usage. For example, the microprocessor is configured to read and time stamp sensor data and to access and correlate with date and time-stamped data comprised in the memory, create a time-elapsed stamp and compare with compliant and non-compliant time-elapsed values stored in the memory, and output data and time-elapsed stamp for remote monitoring. This enables correlating real time sensor data and correlating real time data with historic data, such as date of commencing medication, and time elapsed since commencing medication.

In embodiments an SU is comprised in an intra-responsive device herein. Sensor output to a microprocessor causes the microprocessor to access data routine(s), correlation routine(s), status routine(s), threshold routine(s) and/or escalation/alert routine(s) comprised in the memory, make a determination of data compliance, and in case of a determination of NA or of threshold MA or escalation MA, to output to RCU for initiation of triangulation responsive control request to VD and/or SPK and/or same or different SU and/or escalate for remote monitoring and intervention. In embodiments the SU is configured to output all sensor data and the RCU is competent for determination of data compliance.

A SU herein may be integral with the device or separate therefrom and in direct circuit, wired or wireless data connectivity, optionally attachable thereto by means of a wearable-attachment. In embodiments one or a plurality of SUs are embedded in the AU of a device or module herein, and in communication with the OU by wireless connectivity, e.g., SR-RF, or by printed or optical circuitry e.g. IC.

The device may have wearable-AU or patient AU and connection portals/datashare docking units or datalink for directly interfacing with one or more SUs, which may be comprised in independently wearable module(s), wearable at the same or a different part of the body to the location of wearing the device, such as a wearable activity monitor or sensor e.g. Fitbit™ or the like. An SU may be comprised in a device or an AU, and configured for optical or direct (physical) contact with a part of the patient such as the skin, for example comprised in a band or strap facing inwardly to the patient body.

Smart Materials and Systems

The term "smart" herein refers to a stimulus responsive system or material which undergoes a change in a measurable or detectable property in response to an external stimulus, herein a stimulus of the patient or patient's environment. or a transduced stimulus thereof, more particularly, a reversible change, for example the material reverts to its original state in absence of the stimulus, more particularly with minimal or no hysteresis. Advantageously a stimulus response requires no external power input.

Non limiting examples of a stimulus include mechanical, such as force, pressure, strain, stress, particle vibration or friction, pulse, acoustic wave or ultrasound, ionic strength, pH, hydrophilicity, polarity, static charge, electrical, magnetic, electromagnetic or optical radiation or field, thermal or differential, light more particularly visible solar (100 nm to 1 mm range including infrared and ultraviolet) or visible indoor (275-950 nm range including LED light), UV or IR, including change in an intensity, a biochemical event such as binding, ionisation, reaction, or presence, amount or absence of a substance or compound including water, humidity or moisture, degradation products, and the like and changes therein and combinations thereof.

Non limiting examples of a smart system include piezoelectric, triboelectric, magnetostrictive, electromagnetic, pyroelectric or thermoelectric, shape memory, pH-sensitive, thermochromic, chromoactive, chemochromic, photoactive, electroactive, photoelectric, and the like, and combinations thereof. Any of the foregoing may be comprised in a smart sensor herein as a stimulus responsive component and/or a transducer component. Particularly useful systems which may be employed in an EHU include piezoelectric, triboelectric, magnetostrictive, electromagnetic, pyroelectric (thermoelectric), shape memory and the like and combinations thereof. The following are non limiting illustrations:

Piezoelectric exhibit a stress or strain response to an applied force with accumulation of electric charge or charge separation or displacement. An accumulated charge or charge separation or displacement may be digitally processed into a measurable voltage. For example, a smart material or system is sensitive to variation in pressure, including sound and ultrasound, thermal variation or mechanical force variation and may be configured for longitudinal, transverse or shear loading. Materials or system may be shaped and sized as a single element or as multiple elements arranged mechanically in series and electrically in parallel. A Vertical or Lateral nanowire Integrated piezoelectric system comprises a vertically or laterally grown piezoelectric structure of nanowires, such as layers or array(s), e.g. in a stack of 3 layers or a 2-dimensional array. A system may be polymer matrix impregnated;

Triboelectric exhibit charge separation or static effect response on separation of two surfaces e.g. two materials or a material and patient; more particularly comprised in a system comprising one or two flexible electrodes including single or co-aligned sheet(s) or a composite of a wire and porous polymer configured to contact the patient or each other, generating charge separation and lateral or vertical separation or 3D combination thereof (3D-TENG); configured for generating potential difference for SU output or energy harnessing;

Pyroelectric and thermoelectric exhibit polarization response to a spatial or temporal temperature difference; more particularly comprised in a system or transducer comprising a thermocouple of two dissimilar electrical conductor or semi-conductor materials, configured for harnessing spatial or temporal thermal fluctuation in, expansion or deformation of ceramic or ferroelectric materials; may be configured for direct physical or thermal radiation contact with patient, and is for example a thin film thermoelectric transducer (Tf-TEG) comprising heat absorbing and heat sink thin films coupled to electronic circuitry;

Photoelectric exhibit a free electron release response to incident light such as solar or internal light, more particularly comprised in a system or transducer comprising two semiconductor materials and two electrodes;

Piezoelectric, triboelectric, pyroelectric and thermoelectric systems may comprise a ADC or DSP. Such hardware enables processing polarization and charge separation into measurable or usable potential difference or voltage;

Magnetostrictive exhibit a deformation response such as change in shape or dimensions during the process of magnetization; more particularly comprised in a system configured for harnessing magnetic field induced deformation of magnetic materials. The variation of materials' magnetization due to the applied magnetic field changes a magnetostrictive strain until reaching a saturation value; may comprise a magnetic enclosure enclosing a magnetostrictive alloy inside a magnetising coil, or whisker flow sensor comprising thin-sheet magnetostrictive alloy;

Chromoactive exhibit a measurable colour change response. More particularly a chromoactive material is configured for direct physical contact with patient, e.g. chromoactive material is comprised in a HR or pulse "resus" sensor exhibiting colour change responsive to change in pressure;

Shape memory including polymers, composite, hybrids and alloys, exhibit a shape change induced by heat, light, stress, magnetic field or the like. pH-responsive materials e.g. exhibit a volume change in response to a change in pH.

A smart system or material may comprise one or more shaped component(s), such as membrane, foil, sheet, block, foam, film such as thin film, fibre, rod, bar, wire, electrode, cylinder, tube or nanotube, metamaterial or the like or a combination thereof including 2D and 3D arrays or matrices, bicomponent shaped materials such as bilayers or laminates, woven, knitted, braided, spaced or non-woven textiles of any combination of the foregoing. A smart material may be profiled such as curved or coiled or straight, nanostructured or nanotextured and may have a memorised shape which is different to an ambient shape. A smart system or material is suitably flexible and may comprise flexible material and/or be provided as a thin film (Tf) or fibre such as woven or non-woven textile.

A smart system or material may comprise natural or synthetic organic or inorganic material(s), metal(s) or a combination thereof, such as a polymer e.g any hydrocarbon polymer, a 2-D organic polymer such as graphene, a hydrogel or inorganic polymer such as a polymer of silicon, sulphur, boron, nitrogen and the like or combinations thereof with oxygen, nitrogen and/or carbon; a ceramic; an alloy; or a mixture, composite or other combination thereof, e.g. a hydrogel thereof such as graphene oxide-poly(vinyl) alcohol (GO-PVA) and may be selected from insulating, conducting and/or semiconductor materials, especially electroactive materials including electroactive polymers, piezoelectric materials and other ceramics, polymer fibres, nanotubes, nanowires, nanocomposites and combinations.

The following materials are non-limiting examples which exhibit the indicated stimulus response or are useful in a system exhibiting the indicated stimulus response:

Piezoelectric material includes ferroelectric, textured polycrystalline non-ferroelectric, crystalline, and ceramic material more particularly thin film materials, single crystal and ceramics, such as such as lead zirconate titanate (PZT), potassium and barium niobates, sodium potassium niobate (NKN), barium titanate (BTO), bismuth titanates, wurtzite structure of zinc oxide (ZnO) or perovskites and Zn, Cd, La, Ga, Ba, Nb and/or Ti containing structures, gallium nitride, single crystal zinc oxide (ZnO), textured polycrystalline thin film (Tf) e.g. of ZnO, alloy such as of Indium (In), and polymer material including bulk polymer such as polyvinylidene (di) fluoride (PVDF) and copolymers, polyamides and parylene-C, and non-crystalline e.g. polyimide and polyvinylidene chloride (PVDC), voided charged polymer (piezoelectret) including polymer films or inert matrix comprising piezoelectric ceramic particles, and polymer composite material such as PDMS/PZT, PDMS/BTO and polyurethane (PU) foam comprising polar molecules, and composite such as graphene-$SiO_2$. E.g. PZT-PET (polyethylene terephthalate) piezoelectric, or single layer graphene (SLG) deposited on $SiO_2$.

Piezoelectric materials or systems may be comprised in a sensor or an EHU; Triboelectric system includes combinations of surfaces of any materials or of a patient and a material, including any material disclosed herein, and are suitably shaped materials such as sheet(s), wire(s) or thin films (Tf), e.g. of carbon nanotubes (CNT) and polymers such as thermoplastics (TPEs) e.g CNT-TPE modified TE. Triboelectric systems or materials may be comprised in a sensor or an EHU;

Magnetostrictive material includes magnetic materials such as e.g ferromagnetic such as iron, nickel or cobalt and combinations thereof and their alloys including crystalline or amorphous alloys with metals including Galfenol (Ga, Fe alloy) and Alfenol (Fe, Al alloy), including alloys with rare earth metals, such as Terfenol-D (Terbium, Iron, Dysprosium alloy), and amorphous or crystalline alloys including Metglas (Fe, Si, B, C alloy) and cobalt ferrite (Co Fe alloy). E.g. Metglas may be comprised in MEMS herein, Galfenol, Alfenol and/or cobalt ferrite may be comprised in a sensor herein;

Electromagnetic include metamaterials of any suitable material having shape, geometry, size and orientation configured to absorb or enhance and optionally bend electromagnetic waves and may be comprised in a sensor or an EHU herein; Electrode materials include semiconductors such as alloys e.g. Indium (In) structures, polymers such as graphene (a thin graphene layer may be used as a transparent layer electrode);

Thermoelectric material includes electrically polarized materials which may be shaped such as nanostructured materials such as nanowires, Tf, nanotubes, quantum dots and superlattices thereof, and may be crystalline, organic or inorganic and include group IV tellurides including alloys with bismuth and/or antimony, sodium cobaltate, SnSe (tin selenide), nanocrystalline transition metal silicides, skudderites of cobalt and arsenide, which may be nanostructured, doped or reduced thermal conductivity graphene, polymers e.g. poly polystyrene sulfonate (PPSS), PEDOT (poly(3,4-ethylenedioxythiophene), PEDOT:PSS, PEDOT-Tos (tosylate), polyanilines (PANT), polythiophenes, polyacetylenes, polypyrrole, polycarbazole, and polymer hybrid composites such as polymer composites with CNT or graphene and polymer inorganic thermoelectric composites of inert polymer matrix and thermoelectric inorganic filler, alloys such as silicon germanium e.g. nanowires, and amorphous systems such as Cu—Ge—Te, $NbO_2$, In—Ga—Zn—O, Zr—Ni—Sn, Si—Au, Ti—Pb—V—O; TE properties may be enhanced by combination with functionally graded materials having a variable carrier concentration long the length of the material, nanostructures materials and superlattices; for example a network of polymer embedded CNT and nanowires (Ag) may be comprised in a sensor, more particularly a flexible sensor or in an EHU (Tf-TEG);

Pyroelectric material includes inorganic or organic electrically polarised crystalline material or macromolecular salts or alloys, semiconductor materials or polymers preferably exhibiting large electric fields; materials are suitably shaped such as thin films (Tf) or laminates; such as gallium e.g. gallium nitride, caesium e.g. caesium nitrate, lithium e.g. lithium tantalate and hafnium e.g. hafnium oxide materials, and polymers such as polyvinyl fluorides (PVF), derivatives of phenylpyridine and cobalt phthalocyanine;

Photoelectric materials are comprised in a system of a cell and include inorganic and organic semiconductor materials and combinations thereof and electrode materials as herein defined, suitably configured as a thin film, multifunction cell, organic photovoltaic cell or hybrid solar cell such as dye-sensitised solar cell (DSSC) or perovskite solar cell and nanocells and arrays thereof. Materials include thin film copper indium gallium selenide (CIGS), amorphous silicon, ITO/ZnO/poly 3-hexylthiophene (P3HT):fullerene $PCBM/MoO_3$ and the like; nanocells may be provided on a stretchable editable substrate such as PET, PE, PP or the like;

Shape memory material (SMM) include polymers (SMP) and alloys (SMA) including copper-aluminium and nickel-titanium, composites (SMC) and hybrids (SMH) E.g. nickel-titanium may be comprised in a cardiac sensor for accurate static and dynamic force sensing.

In embodiments a smart system comprises one or a plurality of stimulus responsive component(s) which transduce a response into electrical charge or photons or electrical and/or optical data and signals and/or energy or a combination of one or a plurality of stimulus responsive components with one or a plurality of component(s) for transducing the response into electrical charge or photons or electrical and/or optical data and signals and/or energy. The terms "transducer" and "generator" are interchangeable herein.

In embodiments a transducer may be comprised in a SU, configured to transduce a sensor response into data and signals for SU output, or in any unit, module or part thereof, more particularly PSU, to transduce energy of the patient's body and/or patient's environment into electrical energy or optical energy or stored energy. A transducer suitably comprises a connector or converter such as a mechanical, chemical or optical connector e.g. a shear connector, light filter or light to voltage converter or the like. A transducer suitably comprises an input which may be a smart material or a connector or converter herein and an output Is an SU output or PSU output comprised in a SU or a unit herein.

A smart system herein is suitably a nanosystem, e.g. nanoenergy unit or nanogenerator or smart nanosensor i.e. that harnesses energy or detects or quantifies a marker by nano or small-scale response to an external stimulus in the patient's environment or the patient. A smart system may be flexible, adhesive, transparent or the like. For example, a pyroelectric system may be flexible and/or self-adhesive or a triboelectric system may be flexible and/or transparent. Smart materials and systems are known in the art, for example as disclosed in "Smart Materials for Smart Healthcare", Smart Materials in Medicine 1 (2020) 92-104, the contents of which are incorporated herein by reference. The following are non-limiting examples of known smart sensor and NG materials and systems, which may comprise integrated circuits for SR-RF data and/or signal output or energy output and storage, wherein TEG=thermo(pyro)electric generator, TE=triboelectric, TENG=triboelectric NG, PENG=piezoelectric NG, BP=blood pressure, RR=respiratory rate, SWNT=single walled CNT (carbon nanotube), NW=nanowire:

TE systems: 2A) TENG-TE pulse sensor comprising spaced apart PDMS Tf sensors comprising sensitivity enhancing opposed micro-structured copper (Cu) and Kapton™; 2B) TE SPK (hearing aid) comprises coplanar films of fabricated (microstructured) ethylene propylene (FEP), Kapton and porous AU electrode; 2C) TE flexible fingertip, or other patient member or body part BP sensor comprising etched polymer nanowires on PTFE surface e.g. embedded between PTMs and PET/ITO films or sheets; 2D) TENG sensor of RR and depth comprising triboelectrification layers of polyimide (PI)/Cu/polyethylene terephthalate (PET) decorated fibres and Cu/PTFE coated yarns; 2E) PEDOT:PSS boosted TENG-TE pressure sensor; 2F) TENG based fall sensor comprising electrostatic induction bilayer of Cu and rubber films; 2G) Multilayered triboelectric system of nano PTFE and aluminium (Al) layers encapsulated by polydimethylsiloxane (PDMS);

Piezo systems: Piezoelectric or pyroelectric NG comprised on adhesive thin film or band e.g. PET, for wearing on finger; 3A) ECG/pulse monitor comprising elastomer encased bilayer of a 3D-printed microbump array increasing sensitivity of an aligned pressure sensitive film (e.g. liquid metal track); 3B) PLA based liquid state skin temperature sensor; 3C) piezoelectric and TE adhesive acoustic wrist pulse/heart signal sensor of multilayer polyvinylidene fluoride (PVDF) nanofiber electrodes; 3D) piezoelectric adhesive pulse and RR sensor for wrist comprising ultrathin PET interfacing skin; 3E) pressure sensitive adhesive wrist pulse monitor comprising microstructured PDMS dielectric (e.g. ITO/PET) layer sensitisation enhancer for pressure sensitive layered PDMS Tf/embedded AU source/drain/Pil2TSi semiconducting polymer/microstructured BCB/PI; 3F) piezoelectric motion/pressure sensor of doped graphene (GP), SWNTs, networks of silver NWs (AgNWs) and piezoelectric polymer (PLA) film are fabricated on transparent and deformable PMMA sheets; 3G) piezoresistive and piezoelectric sensor of interlocked ZnO NW arrays on PDMS substrate; 3H) sensor comprising 3D array of piezoelectric lead zirconium titanate (PZT) rods, e.g. epoxy impregnated, on thin polyimide (PI) substrate e.g. with Cu and CU/SN electrode system, e.g. useful as ultrasound sensor of BP waveforms; 3H capacitive pressure sensor comprising silicone elastomer layer sandwiched between inductive spirals of graphene-silver NW hybrid electrodes; 3J) pressure sensor comprising iontronic capacitive sensors with PET substrate; 3K) PZT Tf BP sensor comprising co-aligned PI, AI and PETF films;

Pyroelectric: PEDOT:PSS/Ag, Si, Al pyroelectric NG comprised as (flexible) outer surface of AU;

A smart sensor may include a calibration unit such as sweat-resistant piezoelectric system e.g. lead zirconate titanate (PZT).

Smart SUs

A smart sensor comprises a smart system as hereinbefore defined, more particularly is responsive to a patient marker or associated physiological change, suitably undergoing a material property change, preferably which can be leveraged without any additional control or electronics required, particularly comprising a smart material responsive to a marker of ME herein, such as a pulmonary event marker or cardiac event marker or the like.

Preferably a smart sensor comprises a smart material responsive to a stimulus which is tuneable to a patient marker of ME, more particularly a biomarker of ME. The smart material may be responsive to a single or tuned stimulus value or across a range of stimulus values, e.g. including values being monitored, or a plurality or array of same or different smart materials each responsive at a different stimulus value for example corresponding to threshold and escalation values herein. An array may be comprised in a composite material for example as layers or as distinct phases, e.g. in a polymer blend, hybrid polymer, copolymer or the like.

Suitably a smart sensor is responsive to a stimulus as hereinbefore defined, more particularly selected from heat or temperature or differential, electromagnetic radiation including visible or UV light, mechanical pressure or strain or stress or particle vibration or friction, acoustic waves or ultrasound electrical or magnetic or electromagnetic fields, electric potential or potential difference or voltage, ionic strength, pH, chemical compounds including water, humidity or moisture, degradation products and the like and changes therein and combinations thereof.

A smart sensor herein may comprise a stimulus responsive system or material for example: mechanical force responsive, such as piezoelectric, triboelectric, chromoactive, shape memory materials (SMM); vibration responsive such as electromagnetic or electrostatic, more particularly triboelectric materials; temperature responsive such as piezoelectric, shape memory material (SMM); pressure, light or temperature differential responsive such as chromoactive, magnetorheological, pyroelectric; light responsive such as photoactive or photoelectric, and the like and combinations thereof.

A smart sensor material or system for example comprises a biomarker sensor such as pressure, temperature, polarity, pH, optical including colour or intensity or like sensor, which is configured to provide a first response in absence of stimulus such as a marker herein and to provide a second response on detection of a stimulus such as a marker herein. A change in response is, or causes, a quantifiable electrical, optical chemical, or mechanical response such as change in electrode response, material state or conformation, such as ceramic or polymer state or conformation, colour or intensity, polarity, or the like. A smart sensor may be comprised in a device herein as a coating or layer at an internal face thereof, more particularly at a contact face configured to face inwardly to and to contact the patient, e.g. for optical or direct contact with the body.

Non-limiting examples of a smart sensor include a self-powered TE based pulse sensor, blood pressure sensor, endocardial pressure monitor, mechanoacoustic heart beat sensor, or liquid metal based sensor for ECG and pulse monitoring; piezoelectric artery pulse and breathing sensor; polydimethylsiloxanepolyethylene terephthalate (PDMS-PET) laminate TE sensor for ECG and pulse monitoring; chromoactive "resus" sensor exhibiting a colour change responsive to a change in a pressure, e.g. pulse or heart rate.

An SU herein may be self-powered. Non-limiting examples include a triboelectric nanogenerator (TEG, TENG) powered piezoelectric pulse monitor. A self-powered pulse sensor for example comprises a Tf-TEG nanogenerator electronically coupled to a TE based pulse sensor.

A temperature sensor includes no-contact thermocameras which may incorporate a themopile sensor, a microbolometer sensor, a pyroelectric sensor or a ferroelectric sensor, chemical sensor including polylactic acid (PLA). Pulse and respiratory rate sensors include pressure sensitive sensors including resus sensors.

Biomarker SU

An biomarker SU herein is responsive to change in heart rhythm, bradycardia, ECG disturbance or the like as a marker or indicator of ME associated with cardiac medication such as beta-blockers; or to symptoms of psychosis, e.g. anxiety, depression, panic disorder, obsessive-compulsive disorder, schizophrenia, bipolar disorder, sleep disorders, panic attack or stress, change in mood, drowsiness as marker or indicator of ME associated with antipsychotic medication such as e.g. anti-anxiety medication, antidepressants, psychotropics such as clozapine, mood stabilisers or stimulants.

A frequent side effect of Clozapine™ (schizophrenia medication) is increase in body temperature during first 28 days, indicating a sub-clinical reaction with potential to lead to more serious side effects. Suitably a sensor herein is specific to body temperature as a biomarker. A temperature monitoring sensor herein is sensitive to temperature in the range of human body temperatures, for example 35° C.-42° C.

A frequent side effect of Clozapine™ is tachycardia (increased heart rate or pulse), with potential to lead to palpitations and if sustained, to contribute to cardiac adverse event including sudden cardiac death. Suitably a sensor herein is specific to heart rate as a biomarker. A heart rate monitor may be configured in SR-RF communication with a fitted pacemaker.

A sensor herein may be configured to detect change in glucose level, activity levels, blood pressure including low blood pressure or respiratory rate including slow breathing, or loss of balance, involuntary movements including muscle spasms or tremors, confusion or memory problems as a marker or indicator of ME associated with medication e.g. for diabetes or cardiovascular conditions such as heart muscle-related problems, stroke, and the like. A sensor may be for loss of balance such as for example a movement sensor, accelerometer and/or height sensor, heart rate monitor or blood pressure sensor as a critical parameter of change in activity, stability or falls, as a marker or indicator of ME relating to cardiovascular or diabetes medication. A heart rate monitor configured to alert to falling heart rate or blood pressure is also a marker or indicator of ME relating to orthostatic hypotension or fall-risk e.g. in elderly. Biometric data feedback to the monitoring centre facilitates an alert and intervention ahead of adverse event such as a patient fall. A sensor may detect or monitor steps as critical parameter for respiratory rate or oxygen saturation as a biomarker of COPD ME, e.g. inhaler use vs distance walked (number of steps).

Non-limiting examples of types of cardiac sensors herein include: heart rate, heart rate variability, blood volume pulse. A cardiovascular sensor may be configured for sensing electrical, impedance and/or optical stimulus as a sensor of one or more cardiodynamic parameters more particularly one or more haemodynamic parameters such as Stroke Volume (SV), Heart Rate (HR), Cardiac Output (CO), Ventricular Ejection Time (VET), and/or Pre-Ejection Period (PEP)

A blood monitor may be configured for sensing systolic blood pressure, diastolic blood pressure and/or mean arterial pressure.

A cardiovascular sensor is for example an electrical or optical heart rate monitoring sensor, comprising electrical sensors or electrodes, or optical sensors or light emitting sensors, more preferably a self-powered electrocardiogram (ECG) and/or impedance cardiogram (ICG) or photoplethysmogram (PPG) or any SU comprising a pressure sensor, electrodes and transistor in combination. An SU may be e.g. a heart beat monitor such as a triboelectric, piezoelectric, thermoelectric or solar powered monitor. A Smart ECG may comprise CNT-PDMS nano ECG patch electrodes.

Acoustic SU

The device herein suitably supports voice recognition factors for identifying changes e.g. drowsiness that can provide safety alert due to over medication or stroke so provide early warnings of potential fall.

Speech as a neuromuscular performance, is affected by the physiological state of the individual which can affect the processes of respiration, voice and articulation as well as motor control and planning that goes into speaking. Monitoring speech as audio input is non-invasive and enables remote monitoring of a patient. In embodiments, audio response input herein provides an indication of MA and/or ME, such as non-adherence or abnormal response to medication. For example, slurred speech may be a marker of stroke, monotone voice or slowed speech may be a marker of depression onset, detection of drowsy features in voice analysis may be a marker of overmedication by a patient taking medication to slow heart rate, such as beta-blockers. Thus audio response input is a critical parameter for a patient biomarker such as heart rate.

The device herein is suitably configured to monitor voice changes. A MIC herein is suitably selected from one or more ASUs for example a voice responsive AS or microphone, such as for detecting sound wave, a sensor detecting sound generated properties such as changes in light intensity, optical waveforms, mechanical vibrations and the like and combinations thereof.

A MIC is configured to provide or generate a digital signal suitable for intelligent voice reconstruction. An AS/MIC herein senses acoustic waves propagated through air, or through fluid and/or solids such as transcorporally or transdermally, such as contact or epidermal acoustic sensor(s) and the like. Preferably therefore a MIC herein is configured for sensing acoustic waves at a display face or a contact face of the AU herein. An epidermal, in-ear or like AS is configured for speech impaired.

Preferably an AS is a smart sensor such as a piezoelectric or magnetostrictive sensor, triboelectric nanogenerator integrated with a polymer tube, a gel coupled sensor or the like.

In embodiments one or more ASs comprises one or a plurality of high fidelity microphones (HiFiMIC) or a combination thereof with one or more low fidelity microphone(s).

A HiFiMIC is configured for high quality reproduction of sound, ideally with inaudible noise and distortion, and flat (neutral, uncoloured) frequency response in the fundamental frequency range of the human voice, preferably a consistent audio signal that enable accurate analysis of the sound and detection of changes in intensity and spectral properties. A HiFMIC may be tuneable to a quantifiable calibration signal.

A HiFiMIC or array may be comprised in a module herein for wearing on a patient member or body part at fixed distance and orientation to the head, suitably may be mounted on the chest, neck or head. This enables capture of consistent speech signal. An acoustic sensor may be configured in a module herein for attachment to a patient member or body part and detect speech by vibration transmitted within the body. An acoustic sensor may capture consistent speech.

Preferably a HiFiMIC is a condenser microphone and may be an electret condenser microphone (ECM) or a micro-electro-mechanical or microchip (MEMS) condenser microphone or the like, for example having sensitivity at least in the range 46 dBV to 35 dBV. A MEMS microphone is selected from a capacitive and a piezoelectric MEMS. A MEMS microphone comprises a MEMS chip or circuit comprising a condenser, having a moving diaphragm or membrane, and a logic chip or circuit (ASIC=application-specific-integrated-circuit). The circuits may be mounted on one or both sides of a printed circuit board. The MEMS circuit may be enclosed to the rear by a metal cap.

A capacitive MEMS microphone herein comprises a flexible conducting polymer membrane, as electrode, spaced apart from a backplate, as counter electrode, by a membrane gap. The membrane is configured to vibrate in response to incoming sound pressure, thereby varying the membrane gap and the capacitance between membrane and backplate. Capacitance generates an electrical signal that represents sound.

A piezoelectric MEMS microphone herein comprises a membrane comprised of one or more flexible piezoelectric plates. The plate is configured to flex in response to incoming sound pressure, thereby varying stress experienced by the piezoelectric material and the electric charge generated. Electric charge generates an electric signal that represents sound. Two plates may be configured as a single layer, with a free end of each plate positioned over the acoustic port, whereby the free end of each plate is positioned for maximum exposure to sound pressure. Piezoelectric MEMS microphones are commercially available such as Vesper piezoelectric microphone. The condenser and logic may be encapsulated by a metal cover having an acoustic port for sound entry, and may be top-ported or bottom-ported.

A MEMS microphone herein may comprise a single backplate or dual backplates, and a single membrane or dual membranes. Preferably the MEMS microphone comprises a dual backplate configuration having the membrane positioned between two perforated backplates, or a dual membrane configuration having two membranes positioned about a single backplate.

Suitably a microphone is configured for one or more of: flat frequency response or wide dynamic range in the range from 50 Hz, for example in the range 50 or 80 Hz to 22 kHz, 14 kHz or 7 kHz, for example 50-22 kHz or 50-7 kHz; acoustic performance, including sensitivity in the range between −46 dBV and −35 dBV, (5.0 mV/Pa to 17.8 mV/Pa), preferably between −40 and −35 dBV (10 mV/Pa to 17.8 mV/Pa) such as 38 dBV and signal to noise ratio (SNR) in the range; directionality; contaminant-proof; low power consumption; operates with minimal voice compression.

A flat frequency response ensures that each voice frequency is equally represented in the required range. In general, the fundamental frequency of the complex speech tone—also known as the pitch or f0—lies in the range of 85-180 Hz for men, 165-255 Hz for women and around 300 Hz for children. In general, the range of the human voice extends from 80 Hz to 14 kHz.

A piezoelectric microphone has wide dynamic range, whilst a capacitive microphone has high sensitivity. Preferably the device comprises a combination of a selectable piezoelectric microphone and a selectable capacitive microphone.

Microphone sensitivity is diminished by contaminant ingress, such as ingress of moisture or particles such as dust or by acoustic overload damaging the membrane. Particles and moisture become trapped in the membrane gap obstructing membrane vibration. Particle accumulation obstructs membrane vibration. Moisture evaporation forms a vacuum obstructing membrane relaxation. Acoustic overload exceeds the capacity of the membrane to absorb sound pressure and reduces flexibility or perforates the membrane. Preferably a MEMS microphone herein is shielded, for example by means of a flexible polymer seal or mesh positioned over the acoustic port. An encapsulated condenser MEMS microphone comprises a low hysteresis flexible polymer seal. Preferably a piezoelectric MEMS microphone herein omits a backplate. Thereby there is no membrane gap and accumulation of contaminant is eliminated. Preferably a piezoelectric MEMS microphone herein comprises a plurality of plates and/or a composite plate structure comprising a sandwich of layers of same and/or different piezoelectric materials. Dual plate flex delivers enhanced sensitivity. Preferably a capacitive MEMS microphone is a dual-backplate MEM. Preferably a MEMS microphone has high back volume beneath the metal cap.

Microphones have different front, back and side sensitivity, e.g. omnidirectional, bidirectional, cardioid or a combination thereof. Advantageously a cardioid microphone herein has high forward and side sensitivity in a symmetrical or asymmetric 3D cardioid plane curve disposed forward and to the sides of the microphone. Cardioid microphones have enhanced sensitivity oriented towards and to the side of the patient compared to orientation away from the patient.

Cardioid microphones are commonly used as vocal or speech microphones. Conventionally a microphone might be positioned, for example in a smart watch, with corresponding orientation for simultaneous observation and conversation. However, the device herein must be competent to receive and transmit speech from a patient who may be in a confused or weakened state, and therefore unable to position the wearable to speak into the microphone. For example, a device for attaching about the wrist may be configured to be worn with the VD in a desired orientation for convenient observation by the patient, often "outwardly" away from the palm, but may be "inwardly", towards the palm, or to the side of the wrist proximal to the patient.

In an advantage the device herein comprises an AU which presents a continuous curved outward facing face adapted to encircle a member or body part of the patient in skin contact therewith. Preferably the device herein comprises a plurality of directional microphones, preferably selected from omni-directional, cardioid and bidirectional microphones, for example a plurality of cardioid microphones, spaced apart along the length of the attachment. In an advantage each microphone is characterised by its orientation relative to the encircled patient member or body part. In an advantage the device comprises 2, 3, 4, 5, 6 or more microphones.

The device herein may comprise an array of same or different microphones.

Preferably the device comprising a combination or array of selectable piezoelectric, capacitive and/or directional e.g. cardioid microphones is configured for selection and activation of a specific microphone or directionality by command entered into the device by the patient or remotely by the MAM centre. E.g. a plurality of independently selectable and operable microphones, of same or different directionality, mounted for different orientations relevant to a sound source, in particular to a patient wearing the device.

Voice Capture

In embodiments, the interactive AP receives interactive voice input for real time transmission of patient audio recording or signal and determination of paralinguistic properties of patient's speech by means of remote signal processing, preferably enabling machine learning. Thereby the MAMS centre may monitor the PPMW.

In embodiments the device comprises a voice capture unit, voice analysis unit or voice processing unit or capacity (VCU, VPU), e.g. comprised within the AP or in the OU or RCU, interactive with MIC. A VCU captures voice data for processing locally or remotely. The device may transmit real time voice data processed by the VPU as recordings or as digital signals or analogue signals for remote recording and saving, preferably converts analog voice signal to digital signal for transmission and may operate a VOIP (voice over Internet), VoLTE (voice over long term evolution), VoeLTE, VoNR, Vo5G, EPS, FR or RAT FB protocol, and corresponding satellite based protocols or the like, or a sampling frequency or audio bit depth from 8 kHz or 8 bits, preferably from 16 kHz or 16 bits. The VPU or a remote VPU may be an intelligent VPU, suitably configured to interpret language, mental state, such as indicated by tone or pitch, fluency, volume, quantity, rhythm, rate and quality of speech, e.g. may operate NUANCE™, Microsoft Voice-Vault™, RAYTHEON™ or like technology.

A device configured for transmission of voice recording for remote voice analysis or processing, for example at a remote server hosting or communicating with the patient medical record database and the MAMC, comprises high fidelity communications network connectivity, e.g. satellite communications network.

Biometric SU and Identification Unit (IDU)

The wearable device is configured for daytime and/or night-time wear, more particularly 24/7 wear, and to encourage adherence to wearing, e.g. the device is sized and shaped to permit of 24 hour wear. More particularly the device is a prescription wearable or precautionary wearable or advisory wearable, e.g. is configured for continuous wearing such as to ensure the safety of the patient or of a person other than the patient.

In embodiments the device comprises a biometric SU as an indicator of the device not being worn or being worn by a person other than the patient, for example comprising an iris or face or fingerprint recognition sensor.

A biometric sensor may be comprised in the VDU or the AP, for example is a fingerprint sensor associated with the VD display interface or VDTOOL e.g. incorporated in a "home" or "wake" input tool or the like or is an iris or face recognition sensor associated with an AP camera or is associated with the acoustic sensor.

Identification Unit and Intentional Non-Adherence

Non-Adherence (NA) is less than 100% MA. A measure of up to 50% NA in a population is frequently interpreted as people taking less than 100% of their medication, for example only taking 50% of their medication. In reality, NA includes taking too little or too much medicine, at incorrect times, or other incorrect behaviours, any of which are potentially unsafe. NA may be unintentional or intentional. For example, in the UK NA has been estimated as 55% unintentional, with patients simply forgetting to take their medication as prescribed, e.g. within 10 days of commencing medication. The remaining 45% is estimated as intentional NA.

Several clinical scales measure a patient's MA in three dimensions by questionnaire addressing: MA behaviour; belief in medication, and motivation for medication including side-effects. The Medication Adherence Rating Scale (MARS) and Clinician Rating Scale (CRS) measure adherence to psychoactive medication. Questions cover extent to which a patient forgets to take medication, range from complete refusal/it is unnatural for my mind and body to be controlled by medication, through passive acceptance to active participation, and extent to which side-effects influence medication-taking behaviour.

Advantageously the device is configured to enhance patient compliance, for example by facilitating and motivating MA, with resulting improvement in health outcome, thereby positively influencing motivation to wear the device and motivation to medicate.

The device herein may be customisable, preferably comprises a plurality of modules as hereindefined, configured for customising to a patient's preferences. This hardware enables patient involvement in selection of sensors of patient data, biomarkers or biometrics. This contributes to patient empowerment or motivation to take medication. For example, a marker of ME may be monitored by choice of SU e.g. comprising electrical sensor, optical sensor, acoustic sensor or the like and by a choice of biomarker, or parameter, e.g. cardiac health may be monitored by parameter relating to pulse rate, blood pressure, oxygen saturation or a combination thereof.

In embodiments SU(s) herein is/are embedded or concealed in the AU and/or the MAMU. Monitoring is discrete or unobtrusive. The patient can consent to monitoring and be shielded from associations which can negatively affect motivation to medicate, such as fear, denial, belief and the like. Suitably a biomarker or biometric SU herein is comprised in a part of the MAMU or the AU which is configured for operation by patient touch, such as the VDTOOL, an AP control such as volume control, call initiate or accept and the like.

The AU herein may be secure, for example the device is permanent, i.e. cannot be removed by the patient. A secure or permanent AU may be flexible or rigid, may comprise a lockable clasp such as locking pin or lever, electronic lock such as magnet, solenoid or motor operated clasp. Locking systems are known in the art of surveillance tags. A lockable clasp may be remotely operated. Such hardware enables a device configured for a non-compliant patient.

In embodiments an AU comprises SMM, and has a memorised open strap shape at non-ambient condition, e.g. elevated temperature such as in excess of 50 C and a closed loop or generally annular shape at ambient condition. Methods for 4D printing SMMs are known in the art.

The AU herein may be non-secure, for example the device is temporary, i.e. may be removed by the patient. Preferably a non-secure device comprises an IDU comprising a biometric SU as hereindefined of a marker or indicator that the device is/is not being worn or worn by the patient. Preferably the IDU is configured to communicate biometric performance markers-of-self of motivation to take medication based on device wear-time, e.g. % time worn such as hours worn per 24 hours, and increase or decrease. The device thereby is configured to enhance patient empowerment, for example may positively influence motivation to wear the device and motivation to medicate. Additionally, the device comprising an IDU is competent to indicate the device not being worn or being worn by a person other than the patient, e.g. configured to communicate biometric identification data and/or performance markers to the MAMC for incorporation in triangulation and/or issue of an alert.

Power Supply Unit (PSU)

The device may comprise any known or novel PSU. Preferably the device including units or modules herein is self-powered or self-sustained. The PSU may comprise one or a plurality of power supplies for powering the device, units and/or modules, selected from one or a plurality of power generating unit(s) such as one or more energy harvesting unit(s) (EHU(s)) such as solar power unit, more particularly nanoEHU(s) or nanogenerator(s), for example which generate and/or store energy using nano or small-scale systems or mechanisms, and/or wireless energy receiver(s) (WER(s)), such as inductive, magnetodynamic or capacitive WER(s), i.e. near field, and/or resonant inductive or RF or microwave or laser WER(s)), i.e. mid-field or far-field e.g. electric current, magnetic induction, air charging and the like WER(s) and/or energy storage cell(s) (ESC(s)) such as one or more capacitor(s), super capacitor(s) or rechargeable battery(ies) or cell(s). Thereby the device may operate with infrequent or no need for charging operation by the patient.

Preferably the PSU comprises two power supplies, such as EHU, WER and/or ESCs or a combination thereof or with another power supply; this hardware enables power switching, and enables continuous energy harvesting from complementary intermittent energy sources. An EHU herein may be a hybrid EHU configured to harvest a combination of energies from different sources, preferably a hybrid NG comprising two or more systems or mechanisms which may be in series or parallel, such as a solar NG and a piezoelectric or triboelectric NG in series.

In embodiments the PSU comprises one or a plurality of power supplies, more particularly EHUs and one or a plurality of ESCs). For example a PSU comprises one or a plurality of EHUs coupled with one or a plurality of a capacitor or preferably and battery, and power transmission channels which may be optical, wired or wireless for communicating with a unit, module or part thereof. The PSU may comprise a power controller, such as an MCU suitably for managing variable energy harvesting including under and over voltage, regulating power supply for use or storage and the like. For example, a system includes a plurality of power supplies and a power controller. The plurality of power supplies outputs power to a load. A serial bus connects the plurality of power supplies in a daisy chain. The controller is connected to first and last ones of the power supplies by the serial bus. The controller is connected to a management bus via a management bus interface. The controller monitors the plurality of power supplies via the serial bus. The controller transmits status information of the plurality of power supplies to the management bus via the management bus interface of the controller.

The MCU is configured to sleep when not in run mode. Such configuration conserves energy. The MCU may be a unit MCU such as a SU MCU.

The PSU and ESU may be independently central comprising one or a plurality of power supply(s) and/or ESC(s) and power transmission channels for supply to respective units, modules and/or parts thereof, distributed comprising a grid of power supplies and/or ESCs and energy transmission channels for power sharing by a plurality of respective grid-connected units, modules and/or parts thereof, local wherein units, modules and/or parts thereof comprise one or a plurality of dedicated power supply(s) and/or ESUs, or a combination thereof. Energy transmission channels are wired or wireless (WET wireless energy transfer) channels and include channels for electromagnetic including light, optical or photonic, acoustic, radio-wave, microwave, thermal, electrical, magnetic induction or magnetoelectric energy and combinations thereof. In embodiments energy transfer from a central PSU or ESU or within a distributed PSU or ESU network is by WET as hereinbefore defined, for example using a WER comprising a smart system or material as herein defined.

In embodiments a PSU comprises at least two power supplies configured for harvesting energy of different types, e.g. thermal differential energy, solar energy and kinetic energy, preferably configured for 24/7 energy harvesting. For example kinetic energy harvesting from sleeping patient may be minimal, solar energy harvesting is daylight limited, thermal differential energy harvesting may be effective 24/7. References herein to a PSU include any collection of one or more PSU such as EHUs configured to individually or jointly power the device. This means that the singular term "PSU" is intended to imply one or more PSUs.

A rechargeable battery is suitably a nano metal ion battery such as lithium (Li-ion), sodium (Na-ion), potassium (K-ion) or magnesium (Mg-ion), and may be cylindrical, square, button shaped or flexible. Batteries are known in the art and include negative and positive electrodes, electrolyte and may include a separator. Liquid state batteries include a casing. Anode and cathode may comprise monolithic anode and cathode material or may comprise anode and cathode materials supported on a support substrate such as a metal or conducting foil.

Negative electrode materials may comprise solid metal such as Li, Na, K or Mg.

Some examples of negative electrode materials in Na-ion and K-ion batteries are amorphous "hard" carbon, graphite in presence of a co-intercalating electrolyte such as ether-based, and liquid K—Na alloy, sodium or potassium titanates (STO, KTO).

Some examples of positive electrode materials in Na-ion and K-ion batteries are sodium and potassium transition metal oxides with iron, nickel, titanium and manganese such as sodium iron manganese oxide, sodium manganese nickel iron magnesium oxide and sodium nickel manganese titanium tin oxide and doped nickel based sodium nickel manganese magnesium titanium oxide, polyanion cathodes such as sodium vanadium phosphate and fluorophosphate, metal organic frameworks (MOFs) such as Prussian blue analogues (PBA) e.g. nanoparticles of cobalt and manganese hexacyanocobaltates and sodium or potassium cyanoperovskites, and Prussian white analogues such as sodium or potassium ferricyanates.

Some examples of negative electrode materials in Li-ion and K-ion batteries are graphite, lithiated clathrates or lithiated graphite e.g. $LiC_6$, and lithiate graphitised carbon materials, CNTs including SW and MW CNTs, carbon black, graphene, graphene oxide, hydrogen treated graphene nanofoam, metals, alloys and metal oxides such as cobalt oxide, titanates and lithium titanates (LTO) such as lithium-titanium-oxide, titanium dioxide, spinel, brookite, and nanotubes, nanowires, gel-derived forms and shaped particles thereof, niobates, transition metal oxides including cobalt, nickel, copper, iron, lithium anodes in lithium-air, lithium-sulfur, polymer electrolyte or manganese, vanadium or molybdenum dioxide/pentoxide/oxide cathode batteries, silicon-lithium alloy, silicon which may be porous, encapsulated or caged, nanowire or metal-bound, such as graphene- or carbon-encapsulated or caged silicon, silicon coated CNT, tin, lithium tin and intermetallic lithium alloys such as copper tin and copper antimonide, 3D porous variants of the foregoing including ceramic materials such as 3D porous lithium titanate and semisolids.

Some examples of positive electrode materials include charged materials such as spinels, vanadium pentoxide, molybdenum oxide or oxide of lithium vanadium, discharged materials such as carbon, lithium cobalt oxide, lithium nickel manganese cobalt oxide (NMC), manganese oxide materials such as lithium (LiMO), sodium (NMO), potassium (KMO) or magnesium (MMO), lithium manganese silicon oxide, lithium iron phosphate, the olivine structure thereof, vanadium oxides including borate melt glass, optionally graphite or graphene oxide coated, carbon, graphite or graphene oxide coated sulphur, cobalt oxygen doped iron fluoride and the like and combinations thereof, for example CNT-LMO/NMO/KMO/MMO composite yarn. A lithium-air battery comprises air positive electrode with lithium or lithium cobalt oxide anode.

Electrolyte for Na-, K- and Li-ion batteries may be solid state, semi-solid or gel or liquid state such as superhalogen, its salt such as Li, Na or K halogen phosphates and borates (e.g. $Li/Na/KPF_6$, $Li/Na/KBF_4$, Li/Na/K sulfonylimide including fluorocarbon such as trifluoro or bisfluoro (e.g. Li/K/NaTFSI, Li/Na/KFSI), in liquid organic solvent such as organic carbonate, sulfone, imide, polymer such as polyethylene oxide and fluorinated derivatives, perfluoropolyether (PFPE), and solid state electrolytes including Li/Na/K superionic conductors such as compounds of Li/Na/K, germanium, phosphorus and sulfur such as Li/Na/K thiophosphate, thin glass electrolyte such as Li/Na/K phosphorous oxynitride (Li/Na/KPON), glassy ferroelectric electrolyte e.g. comprising Li/Na or K ions, e.g. together with oxygen and chlorine ions, a doped variant thereof such as barium doped variant, solid polymer electrolyte such as PVA, e.g. basic PVA such as KOH-PVA, polyaniline (PANI) or the like.

A solid-state electrolyte battery is preferably a thin film battery and may comprise a pure metallic negative electrode such as pure metallic lithium, sodium, potassium or magnesium. A positive electrode in case of a solid state battery may also be carbon based such as a flexible conducting organic material or polymer such as carbon fluoride polyaniline $((CFx)n$ or $(CFx)n$-PANI), particularly ionic bonded forms thereof, or a cobalt oxide such as $Li/Na/K/MgCoO_2$.

An ESC may comprise a capacitor, more particularly a supercapacitor, i.e. an electric double-layer capacitor (EDLC) or electrochemical pseudocapacitor or hybrid thereof or asymmetric electrode capacitor comprising negative and positive electrodes, a separator and electrolyte and casing. A (super)capacitor electrode may comprise carbon or derivatives such as graphene or silicon carbide, metal (transition or noble) oxide such as $MnO_2$, $RuO_2$ $IrO_2$, iron oxide $(Fe_3O_4)$, $MnO_2$ or sulphide such as $TiS_x$ conducting polymer such as polyaniline (PANI), polythiophene, polypyrrole or polyacetylene, or composite of carbon based material such as CNT with pseudocapacitive active such as metal oxide, alkali metal or alkali earth metal ion such as Li, Na, K or Mg or a combination thereof (asymmetric).

A (super)capacitor electrolyte may comprise aqueous or organic solvent and dissolved chemicals, or liquid ionic salts. A solvent may comprise water or organic solvent such as acetonitrile, propylene carbonate, THF, diethyl carbonate, gamma butyrolactone. Dissolved chemicals may comprise sulphuric acid, alkalis or salts. A liquid ionic salt is for example a quaternary alkyl ammonium salt such as tetrafluoroborate.

An electrode is typically very high surface area or nanostructured, for example comprises nanostructured material such as porous or holey material e.g. activated carbon, holey carbon such as holey graphene (HG), carbide-derived carbon, carbon aerogel, graphite, graphene, graphane or CNT, thin film or sheet, nanofiber, nanotube or nanowire such as CNT or CNW, yarn-based material, fabric or cloth such as nested- or core-shell electrode material, of one electrode pole or core nested within the other electrode pole or shell or woven or carbon-fibre cloth, or is comprised in an electrode array such as 1D or 2D array of alternating negative and positive electrodes or rows thereof, packed grids such as hexagonal 1:2, alternating triangular poles, or comprises. Electrode may comprise flexible material including Miura fold variants of any of the foregoing, or a flexible fiber yarn such as flexible CNT fiber yarn e.g. comprising CNT-LMO or the like composite yarn positive electrode sheet and sandwiched CNT and silicon-coated CNT sheets negative electrode with gel electrolyte. Core-shell electrodes may be conveniently separately rolled and wound together separated by electrolyte such as gel electrolyte, optionally wound onto a polymer fiber; or polymer ES materials such as Li/Na/K/Mg-polymer, screen printed ES material comprising a metal charge carrier such as zinc and a solid polymer electrolyte; or porous etched metal halide layer, such as nickel (II) fluoride with a solid polymer electrolyte such as PVA, e.g. basic PVA such as KOH-PVA, or paper ES material such as tin-paper.

In embodiments the device comprises a PSS environment and/or an ESS environment including a hybrid PSS, PSS/ESS or ESS environment comprising wearable power supply material and/or wearable energy storage material. Such wearable material is suitably stretchable and editable, more particularly comprises nanowires or nanofibers or core-shell yarn thereof comprising smart material(s) or electrode material(s) as hereindefined or combinations thereof, such as polymer, composite or carbon based solar cells, smart systems or electrode material e.g. polymer, graphene or carbon fibre solar cells, fiber-based EHUs or NGs or electrodes such as silicon carbide/graphene composite or carbon/nickel hydroxide core shell yarn for example of $MnO_2$. Material is suitably strengthened with a network of CNT and/or nano fibres such as nanocellulose fibres. Such material may be nanostructured as hereinbefore defined for example porous, holey or aerogel.

In embodiments a wearable power supply material comprises a hybrid EHU material comprising nanowires or nanofibers or yarn thereof of a combination of materials as hereinbefore defined for harvesting energy of two or more different sources such as solar and mechanical motion.

The self-powered device herein is adapted for daytime and/or night-time wearing, wherein the power unit is configured to power operation of said MAMU for periods in excess of 12 hours wear time, preferably in excess of 24 or 36 or 48 hours wear time, more preferably for unlimited i.e. 24/7 operation of the device, said device including a sleep/power down mode, for example facilitating low power usage.

Smart PSU

An EHU comprises a transducer configured to harvest or draw charge or energy from one or more external sources, such as energy sources of the patient or patient's environment, capture and store in the device or an ESU associated therewith, more particularly comprised in the OU or MAMU or a SU or a module herein. A device comprising an EHU is suited for operating remote from domestic or terrestrial power supplies. An EHU may therefore be the main power unit or a reserve or back-up and is preferably a nanopower unit (NPSU)/nanogenerator (NG), or nanoenergy unit (NEU), these being interchangeable terms.

An EHU may harness energy of the patient or patients environment or generated by interaction of the patient's body therewith, such as biomechanical, kinetic or ambient energy, thermal energy, charge separation, induction and electric potential energy, magnetic such as electromagnetic, chemical, such as energy comprised in a salinity gradient, from patient physiological chemical reactions generating and consuming compounds such as $CO_2$ and/or combinations thereof.

An EHU suitably comprises a smart material or system as hereinbefore defined, more particularly is configured to harvest energy from a stimulus or transduced stimulus such as:

a mechanical stimulus such as pulse, vocal vibration transmitted within the patient body, fluid flow such as liquid or air flow e.g. breathing or acoustic wave and sources of biomechanical energy e.g. from motions of various parts of the patient during walking, such as heel strike; joint motion; and centre of mass or upper limb vertical motion, kinetic energy generated by the patient body or part, when it is in motion, mechanical or particle vibration including mechanical triggering, such as vibration of device on patients body e.g. wrist, pulse, finger, voice vibration, fluid flow such as liquid or air flow e.g. breathing or acoustic wave;

a temperature differential stimulus such as temperature differential of the patient's body or patient's environment or therebetween, e.g. from mechanical source e.g. friction, thermal source e.g. thermal energy generated when the body is under an excited physiological state, solar energy and the like, or thermal energy dissipated by a light source, kinetic source or the like;

an electromagnetic radiation stimulus such as visible light, e.g. a photovoltaic EHU.

A transduced stimulus is e.g. transduced from a response of a smart material such as SMM, photoactive such as photovoltaic, chromoactive or like.

A piezoelectric, triboelectric (TE), pyroelectric, magnetostrictive or shape memory EHU or NG is configured to harvest i.a. mechanical energy or vibration energy e.g. CNT-TPE modified TENG; a piezoelectric, pyroelectric or shape memory EHU or NG is configured to harvest i.a. thermal energy; more particularly a pyroelectric EHU or NG is configured for harnessing thermal fluctuation, expansion or deformation of ceramic or ferroelectric materials, and may be configured for direct physical or thermal radiation contact with patient.

Most particularly a PSU or a PSS comprises a plurality of a photo-voltaic solar EHU which may be dye-sensitised, a mechanical energy EHU or a thermal energy EHU.

An EHU may be incorporated for example in any part of the device and may be configured for direct or indirect (e.g. thermal) patient contact, preferably comprised on a contact face of an AU or an exterior or viewing face or comprised in a MAMU unit e.g as a transparent layer of a touch VDTOOL or other button or control of the VD.

VDU and AP

VD and SPK input(s) may be parallel inputs configured for simultaneous display and emission of MA reminder. VDU and AP are suitably configured for simultaneous and real time PI and patient communication.

The VDU or part thereof, e.g. VD and/or VDTOOL herein may be configured for vision impaired, e.g. may comprise a sensory i.e. tactile or touch interface, such as touch mapping for example finger- or palm-mapping or readable with a sensory or multi-sensory reader and/or comprise audio output and/or voice activated VDTOOL. An AP herein configured for hearing impaired comprises SPK configured for output to a hearing aid or the like and may comprise a hearing aid or the like.

VDTOOL herein includes one or a combination of digitiser input tools such as touch screen including pressure sensitive screen or panel e.g. for tap or trace visual display entry, or voice responsive input, and the like. VDTOOL herein is suitably a selection tool, e.g. configured for touch or voice selection of displayed content, for example VD is touch sensitive or voice-responsive. Such hardware enables rapid response, reduced power usage and simplicity of operation.

A visual display herein may be LED (light emitting diode), LCD (liquid crystal display) or ELD (electroluminescent display). Preferably a display is an organic LED (OLED) such as small molecule or polymer OLED, more preferably a flexible OLED. An OLED herein emits visible light and therefore works without a backlight, is thus thinner, lighter, brighter and has lower power usage. In embodiments an OLED is or comprises a transparent portion which is configured as a biometric fingerprint scanner.

The VDU may display visual display reminders, alerts, or notifications, performance ratings or medication adherence ratings (MAR) and performance awards and input prompts e.g. in the form of text, symbols, images, icons, pictograms and the like and combinations thereof. The device readily permits of effective MA reminder and response in a language of choice, and/or with pictures and/or audio facility for children and adults with limited reading skills or hearing impaired and/or with large font text for visually impaired.

The VD may comprise necessary hardware, such as resolution, pixilation, colour or the like, suitable for displaying in static or dynamic form or a combination, for displaying drop-down and menu input options, and/or for colour-coded input, such as traffic light or the like.

Reminders may be displayed as app notification or pop-up, interactive screen or audio broadcast. The MAMU may comprise a vibration alert mechanism for sensory reminder alert.

SPK may be configured to output audio reminder and prompt in the form of speech, sound effect, musical tone or the like, any of which may be recorded or computer generated.

For example, a performance award may be notified as dynamic firework image and sound, dynamic applauding image and cheering and the like.

In embodiments an AP herein is an audio-visual platform, and further comprises a camera or videocamera. Visual interaction/contact between patient and MAMC further assists with monitoring PPMW. Moreover, the audiovisual input tool is configured for MAMC detection of ME, by observation of medication actually taken or taken correctly.

Kit and Modules

A device or a kit for a device herein may comprise a plurality of modules, which may be configured on a single or a plurality of AUs herein, e.g. patient-attachment(s) and/or wearable attachment(s). One or a plurality of modules may be interchangeable, for example whereby the device herein is a MAM device specific to a patient's needs e.g. is visually, speech or hearing impaired, or to a patient's medical condition or to a specific medication set or program for a condition, such as schizophrenia or a medication program e.g. for a non-adherent or non-compliant patient.

Preferably the kit comprises a plurality of modules and one or more patient attachments therefor, wherein a module comprises any unit or part thereof or combination thereof such as the OU, VDU, AP, one or more SUs such as biomarker or biometric monitoring units and optionally one or more behavioural monitoring units or SUs such as, sleep monitor, fall sensor and the like are comprised in one or more further optionally interchangeable modules. A plurality of sensor modules may be interchangeable. In embodiments a modular device herein comprises independently patient wearable modules wherein a primary module comprises the OU, the VDU and the SPK and optionally one or a plurality of MIC and one or a plurality of SU, and one or a plurality of secondary modules comprises one or a plurality of SPK and/or one or a plurality of SU. In alternative embodiments a modular device comprises a plurality of modules together with a single AU wherein a primary module comprises the OU and one or more of the VDU, SPK, one or a plurality of MIC and one or a plurality of SU are comprised in one or more secondary modules.

A kit provides for a wearable device specific for a patient's needs, e.g for a visually impaired patient a VD module may be omitted or may comprise a sensory VDU for touch visualisation or readable with a sensory reader; for a hearing impaired patient a SPK module may be omitted or may comprise connectivity for intelligent voice reconstruction, or communicating with a hearing aid; for a speech impaired patient, medication interaction is by VDU, and AP comprises an AS, configured for monitoring vocalisations conducted through the body, for example a human body AS, more particularly an epidermal AS.

In embodiments the AU comprises one or a plurality of module docking points. A docking point may be provided on any face, such as an outer face, inner face or side face thereof. The AU may comprise a removable seal such as an insert or cap, configured to seal a docking point.

A module docking point may be comprised in a module recess, and removable seal may be profiled to cover or fill a module recess. Thereby the device presents a smooth sealed profile.

In embodiments a module docking point is provided on a side of a AU for docking with a corresponding docking point of a module comprising an interlocking AU. In this embodiment a plurality of modules are provided on a plurality of interlocking AUs such as interlocking wrist bands. Interlocking module docking points or module AUs are for example of the snap fit type or sleeve interlocking type. Thereby the modular device gives the appearance of a unitary wearable.

In embodiments the device comprises connectivity for communication with a module or further device selected from a biometric sensor, medication dispenser and the like, such as a physical docking unit or SR-RF unit, e.g. enabling data transfer. Docking may be with a medication dispensing unit providing monitored dosage. In embodiments the wearable device herein provides dose reminder notification and is configured for docking to said medication dispensing unit, which is configured to generate monitoring data. Monitoring data transmission may be by medication dispenser directly or routed via the device herein, e.g. by SR-RF.

Suitably a modular device is a SR-RF communications environment wherein a primary module and at least one secondary module are SR-RF enabled, more particularly the device is a NFC communications environment and/or a BAN communications network such as a Bluetooth Smart environment wherein the primary module, more particularly the OU or RCU provides a SR-RF environment interface, interfacing with MAMU units in the or each primary and secondary module. Communication may be P2P, reader/writer, card emulation, or single-mode or a combination thereof Location Monitoring and Emergency Alert In embodiments the wearable device herein is configured for simultaneous capture of voice data and location data, for real time transmission as hereinbefore defined by satellite or other wireless communication, such as broadband data link.

In embodiments the device herein further comprises a geosensor unit, such as GPS, for detecting location data and interresponsive with VD input, SPK input and/or an SU unit herein such as an accelerometer or movement SU, BP SU, biometric SU or the like configured to detect a marker of an event or event trigger such as stagger/fall and interactive with RCU or OU configured to generate an ALERT signal and issue to patient and/or MAMU. In embodiments the device herein further comprises an emergency button or key or trigger or combination of 2 or more thereof, these being interchangeable terms, configured to issue an ALERT signal. One or more emergency buttons may be configured to activate the device in low power/sleep mode. In an advantage the interresponsive units of the device herein are configured for VD, SPK and/or SU response e.g. to an ALERT control signal and access e.g. by OU or a MCU or RCU, to PI, SU and ME data, for voice analysis and event markers such as stagger/fall, and biometric markers such as device not being worn, and for generation and transmission of validating data. Such hardware enables qualifying whether an emergency alert activation and/or a fall alert is genuine, e.g. whether the device has been dropped or fallen.

The device herein comprising dual satellite network connectivity configured for simultaneous connection to two satellite networks permits location determination, for example by triangulation technique as known in the art.

Operating Unit

An operating unit (OU) herein may be comprised on one or more IC's. An OU may be configured in various ways, such as, but not limited to a MCU, computer on a chip, system-on-chip (SoC), system-on-module (SoM), central processing unit or processor or microprocessor with its required peripherals and/or any other computer capable of executing a set of computer instructions.

Preferably the OU is configured as or is comprised in a SoC, or MCU. An SoC or MCU combines control on a single chip e.g. of a plurality of MAMU units. Such hardware enables rapid and efficient operation and low power usage.

Preferably a MCU herein comprises a plurality of input and output connection pins. Preferably input and output pins are coupled to input peripherals and output peripherals directly or via an RCU.

The OU may comprise a bus architecture and/or HyperTransport architecture, which may be internal or external such as management, system management, control, peripheral interface, data and/or address buses. Buses and express links manage data communication and routing between remote databases, VDU, AP, and sensor units. Preferably the OU is configured to route VDU data to visual display and MAMC, and AP input data and ME data to the remote MAMC. The operating unit may additionally route PPMW data relating to device being worn by the patient to the VD, e.g. as a MoS of MA.

Data transmission is configured in the device in integrated communication and/or in one or a plurality of computer buses, highways or express links for communication between responsive units and modules and/or with and between distributed components such as units and module in wireless connectivity, e.g. SR-RF, and with or between MAMC via docking unit or port or datalink for datasharing. Accordingly, one or more buses and/or highways integrate components of the OU and integrate components of the MAMU with the OU. Preferably the OU comprises one or more same or different buses and/or highways, integrating VDU and/or AP and SU(s), comprised in the OU or in a microprocessor.

Processing Unit (Pu)

A PU herein suitably comprises one or more processors or CPUs provided on an IC, a microprocessor or a multi core microprocessor, most particularly is a MCU combining multiple OU components and MAMU control on an IC.

The PU is suitably selected from one or more programmable processors including application specific system processors (ASSP), application specific instruction set processors (ASIPs), application specific IC's (ASIC), digital signal processor (DSP e.g. for measuring, filtering and/or compressing digital or analog signals, for example for speech or ME data processing). The PU may be local or distributed across units herein. A PU or part thereof may be flexible and may comprise optical and/or electronic circuits.

The PU and memory unit of a device herein are suitably configured to process PI and MAMC interaction, more particularly to access medication dose data such as datasets, to schedule dose reminder notifications and receive medication dose status data output from VD and/or MIC, for real time transmission to MAMC. In an advantage the PU is configured to access centralised remote updated data, signals and programs and to transmit data for remote updating thereof. Moreover, to control and process MIC input, including control of multiple HiFiMIC, and transmission to MAMC. Moreover, to control and process SU interaction and SU interaction with VD and SPK, more particularly to control SU data output and initiate SU routines and SU data transmission to MAMC.

Further references to an operating unit, OU, processing unit, CPU, processor or MCU include any collection of one or more thereof (which may be at different locations) that individually or jointly execute one or more sets of computer instructions. This means that the singular term "operating unit" or "OU" or "CPU" or "microprocessor" or "microcontroller" or "MCU" is intended to imply one or more thereof, which jointly perform the functions attributed thereto. In particular, some functions may be performed on a wearable device and/or on a remote device or location or address, such as a cloud-based server, the MAMC or a MAMC operating unit.

Method for Manufacture

A method for manufacture of the device or a module therefor herein suitably comprises providing or forming an AU about a MAMU and OU, or individual units or parts thereof as hereindefined, for example by extrusion, 3D and/or 4D printing or moulding such as injection moulding. 3D and 4D printing techniques include extrusion such as fused deposition modelling, vat photopolymerisation such as stereolithography, powder bed fusion, digital light projection, material or binder jetting, multi jet modelling, selective laser sintering, electron beam melting, sheet lamination, directed energy deposition or combinations thereof. Units may be laid up prior to, during and/or subsequent to forming the attachment. Units or modules herein are suitably assembled on a scaffold, optionally laid up on a release surface or release web, reel or spool, and an attachment formed thereabout. A device or module may be manufactured as a discrete device or module, which may be a continuous band or an elongate band having securing means at ends thereof. A plurality of same or different devices and/or modules may be manufactured on or in form of a web, reel or spool thereof e.g. for efficient manufacture and convenient handling, with subsequent separation into discrete devices or modules. For example, units may be laid up in a first clean area and transported to a printing or extrusion area for forming the AU thereabout.

Units or modules or part thereof may be manufactured, prior to, simultaneously with and/or subsequent to manufacturing the attachment, using any known or novel techniques for example using 3D or 4D printing technique. Printing of a smart material herein may be by 4D printing which comprises 3D printing with programming of a time-dependent, i.e. dynamic, structural response to an external stimulus, such as for example printing a SMM material at non-ambient stimulus conditions, such as elevated temperature, with a desired memory response e.g. shape, deformation, volume or the like. Circuitry or ICs may be printed for example by etching, hot stamping or screen printing or 3D techniques.

The method employs polymers, plastics, ceramics, metals including alloys, inorganic materials including glass and the like as known in the art and as hereinbefore defined and combinations thereof. There is further provided a device herein, when obtained or obtainable by the method.

Definitions

A patient herein may be an adult or child, in receipt of medication, e.g. having a diagnosis for a medical condition, and who may be assisted by a carer or someone acting on their authority.

A healthcare professional (HP) herein encompasses any healthcare professional such as a clinician or equivalent having direct contact with patients, prescriber or independent prescriber, or any person acting under their authority. MAMC herein may include HPs and personal specially trained to undertake monitoring and to alert an HP.

Medication herein is medication supervised by or prescribed for a diagnosed medical condition, unless indicated otherwise. Medication includes any medicine, therapy or treatment plan requiring supervision or signature by a HP as hereinbefore defined, whether indicated to or licensed for a condition, off-label medication or unlicensed medication, and may include over the counter (OTC) medication, and medication available without prescription according to national law in a given country. Medication herein also includes personalised medicine, to be taken in a manner considered safe behaviour for a patient, for example in the case that a patient cannot manage evidence-based medication treatment regime, and may be developed using clinical decision support, and may be developed from MAM using the device herein. Off-label or unlicensed medication is medication which is prescribed to treat a medical condition other than that for which its use is authorised. For example an authorisation for a medication prescribed to treat a medical condition does not include authorisation to continue use once the condition is effectively treated, to prevent recurrence of that condition or to prevent onset of a risk condition, and is thus considered "off-label" if prescribed for such continued or preventative use; medication authorised for treatment of depression which is also effective in treating neuropathic pain is prescribed "off-label" for such treatment of neuropathic pain.

Embodiments herein may be generally applicable in the case of any new or existing medication such as in the case of a decision on a suitable new medication for a patient, in the case of a review of an existing medication taken by said patient, which may be a periodic review or prompted by a change in the patient's condition, in case of deciding on a long term medication for a patient progressing from an acute medication.

Computer Implemented Method and Associated Aspects

The MAMs wearable device herein can be programmed to access any Medicines Informations software such as MaPPs from Mistura Informatics, GNCR.

The device herein is configured to enable an "internet of things" (IoT) in relation to healthcare more particularly to medication (MIoT), i.e. healthcare data sharing between patient and all HP interacting with said patient. More particularly the device facilitates data sharing between patient and HP including patient ME data including voice data and biometrics, medication administration and management including monitoring of medication-taking, response to medication, and supplies remaining. In embodiments the device identifies by means of a patient identification with a secure access personal online account, for example by means of a log-on, patient barcode and the like. The patient account links all data relating to the patient, and is configured for patient and HP access, for example as a portal to operate the wearable device and access the data for use by the device and generated by the device herein. A database for storage of data including patient responses is a protected database which is accessible by patient and HP.

In a further aspect there is provided herein a computer implemented method for interactive bidirectional MAM for a patient in receipt of medication, by means of a wearable personal digital MAM device as hereindefined. Preferably wherein the device comprises a processing unit, a memory unit and a network communications unit, an interactive VDU and/or interactive AP, ME sensor(s) such as biomarker, biometric and/or behavioural monitoring units, and an attachment unit, and the method comprises a MA sequence comprising:

a MAM step of causing said processing unit to access data locally, such as in a memory unit, or remotely, such as in a MAM database, or by means of a personalised MAM account, relating to a personalised MA program and to issue medication dose data together with MA status query;

a dose status query step of causing said interactive VDU and/or said interactive AP to display and/or emit said data and query;

a patient interaction step of causing said patient to be receptive to said dose status query and causing said interactive VDU and/or interactive AP to receive patient input dose status data responsive to said query;

a MA program updating step of causing said processor and memory unit to update said MA program with said status data or to transmit said data for remote updating; and/or a transmission step of causing said WCU to transmit in real time said status data to said MAMC;

and comprising a MA performance sequence comprising:

causing said processing unit to access data locally, such as in a memory unit, or remotely, relating to medication status as a marker of MA and to issue performance data;

a performance step of causing said interactive VDU and/or said interactive AP to display and/or emit said data;

optionally a patient interaction step of causing said patient to be receptive to said performance data and causing said interactive VDU and/or interactive AP to receive patient input responsive to said performance data;

and comprising a ME sequence comprising:

a ME monitoring step of causing the processing unit to access data generated by a plurality of ME sensors including one or more biomarker sensors, optional biometric sensors and/or one or more acoustic sensors;

and/or a ME status request step of causing the processing unit to receive data relating to a ME query generated by the MAMC; and a ME status query step of causing said interactive VDU and/or said interactive AP to display and/or emit said data;

a patient ME status interaction step of causing said patient to be receptive to said ME query data and causing said interactive VDU and/or interactive AP to receive patient input responsive to said ME query data;

a transmission step of causing said wireless communications unit to transmit said ME data, e.g. biomarker data, any biometric data and said acoustic data and any ME status data to the MAMC for triangulation and detection of ME.

The method provides real time day time and/or night time MAM.

The method may be an on-demand method wherein the MAM sequence is responsive to a patient on-demand step of causing the interactive VDU and/or AP to receive patient input on-demand request. More particularly said MAM step is a medication reminder step of causing said processor and memory to retrieve and schedule a medication dose reminder and issue a reminder notification for display or emission via said VDU and/or said AP.

More particularly said patient interaction step is a medication reminder response step of causing the VDU and/or AP, e.g. a patient input tool or interface, to display one or more fields for input of MA reminder response and receive said response, and/or to be receptive to an audio MA reminder response and to receive said response, or any combination thereof. Input fields are suitably configured for registering, recording or reporting status of MA, such as affirmative or negative, e.g. "medication successfully taken", "yet to be taken" "remind me later" or "not taken".

Patient interactive visual display input or response herein may be selecting prompts or fields or boxes, highlighting or unhighlighting series of shapes. ME monitoring input may include wellbeing monitoring input e.g. on a scale of high to low, scoring on a numerical scale, which may be a VAS (visual analogue scale) displaying a continuum or continuous scale or a discrete scale, scoring by relative term such as low, moderate or medium, high, or scoring on a colour scale such as a traffic light scale from green through orange to red and the like.

In embodiments said medication adherence sequence is an on demand sequence responsive to a patient on-demand interaction step of causing said interactive VDU and/or interactive AP to receive a patient on-demand medication dose request.

An MA performance sequence and/or ME sequence may be continuous or periodic, together with or independent of the MA sequence. Suitably an ME sequence additionally comprises a voice analysis step performed in a database and processing unit, more particularly of causing said processing unit comprised in said device or said MAM service provider to perform data and/or voice analysis and derive patient MA and/or ME status and/or markers.

In embodiments the method comprises a clinical monitoring step of causing a HP VDU and/or AP to retrieve and display or emit said response and/or MA and/or ME status and/or to display an alert in case of MA and/or ME status requiring HP review.

In embodiments the ME sequence includes an identification step competent to indicate the device not being worn or being worn by a person other than the patient, e.g. configured to communicate comprising causing the processing unit to transmit biometric identification data and/or biometric performance markers to the MAMC for incorporation in triangulation and/or issue of an alert. In a further aspect there is provided the corresponding method for interactive bidirectional support for a patient wearing a device as hereindefined. Preferably the method comprises receiving input ME and MA data as herein defined and comprises a triangulation step of causing a MAMC to correlate MA data and ME data for the purpose of attributing anomalies in patient physical or mental wellbeing to MA issues and resolving MA issues.

In a further aspect there is provided a computer implemented MAM service embodying the device or method herein, selected from an application service, for example provided by an application service provider (ASP), a server or data hosting service or website hosting service provided by a hosting server provider.

In a further aspect there is provided a MAM data processing system or network communication system which comprises a combination of one or more interfaces including the device optionally including sensor units or module(s) in short range radio wave communication with the device and MAMC interfaces herein, one or more storage media storing processor-executable instructions, one or more processors for executing said instructions, and means for transmitting a data signal, being arranged to perform the method. Processor-executable instructions include generic instructions such as selection tools, input fields, alert fields and tools. The system suitably incorporates all requisite interfaces, storage means, processing means, and databases, additional HP interfaces and servers including such means and databases being arranged in a MAMC.

The system includes a memory unit configured to receive and store data, or may include one or more local or remote access addresses, configured to indicate the availability of such data stored locally or remotely, and present the option to a patient or a HP, to summon and view such information.

Transmission means is configured to transmit input data, receive external input data, and/or to transmit processor output data and or to issue or and/or receive an alert or message to a HP or patient to access the system.

In a further aspect there is provided herein a hosting service for a patient account for operating the method, or the device herein, comprising:

a server capable of executing, or configured to execute, an instance of a patient MA application with a patient wearable device over a network using a first secure communication channel established between the server and the patient device by the hosting service;

optionally additionally capable of executing, or configured to execute, an instance of a MAM centre application with a MAM centre computing device over a network using a second secure communication channel established between the server and a MAM centre computing device by the hosting service;

a module that is capable of querying, or configured to query, one or more databases and of retrieving, or to retrieve, data sets relating to medication, patient decision aids and/or patient medical records, and of transmission, or to transmit, to a patient account associated with the patient operating the patient device, wherein said communication channels are capable of being established by an account login procedure.

A method or system or service herein is suitable for realising in a distributed computing environment, comprising said MAM device together with a MAMC comprising one or more local or remote MAM database(s) and optionally one or more HP interfaces, in network communication connectivity for carrying out the computer implemented method as herein defined and may be implemented in a cloud computing environment(s), and/or satellite communication environment(s) and combinations thereof. The computing environment may execute computer executable instructions, such as program modules, including routines, programs, objects, components, data structures and the like that perform particular tasks or implement particular data types. Embodiments may be practiced in distributed computing environments in which tasks are performed by remote processing devices that are linked through a communication network. In a distributed computing environment, program modules may be located in both local and remote computer storage media including memory storage devices.

One or more of the components or subcomponents of a system or service or environment herein may be located remotely from the other components thereof, more particularly operating in a networked environment using logical connections to one or more remote computers, more particularly a networked communication environment. A logical connection may be selected from or include a local or metropolitan area network (LAN or MAN), a wide area network (WAN), Internet area network (IAN) also known as the cloud, public switched telephone network (PSTN) and cellular network, in particular in case of mobile networking, and satellite networks, specifically satellite internet, and combinations thereof but may also include other networks, including intranet networks e.g in homes, offices including surgeries, clinics and hospitals, enterprise-wide computer networks, and the Internet. In a particular advantage the method and system operates in a networked environment using satellite communication technology. This has particular advantages for patients and HP operating in rural areas, in undeveloped or developing countries or in other areas with limited or no internet provision or with disruption to national or local internet provision.

In a further aspect there is provided herein a program for a device or interface herein or for a method herein, or an algorithm enabling such program or method, such as a computer program or an app therefor, or a subscription or patient online account, comprising instructions which, when executed by a computer or said device, cause the computer or device to carry out the steps of the computer implemented method as hereinbefore and hereinbelow defined and described.

A patient app causes a device herein to carry out the method steps herein. A MAMC app or HP app causes a MAMC or HP computer or device to perform corresponding MAMC steps of the method herein, comprising in a first mode accessing a patient account comprising healthcare data such as drug history, calendar vs time medicines taking, performance data per medicine, stock management and the like, and in a second mode receiving MA data and ME data including notifications relating to medications adherence, data relating to adverse reaction and the like. An HP app may include compliance steps for progressing a notification before "signed-off" status is assigned.

An online account causes the computer or device to request and receive data packages or data sets from one or more databases and/or to transmit and receive data input by means of the device herein, more particularly as a portal to operate the device and access the data for use by and generated by the device.

In a further aspect there is provided a data set including a health information system or medications database or digitised MA program for use with or generated by means of the device or method herein.

In a further aspect there is provided herein a device as hereinbefore defined or a patient interface comprised therein, when programmed to carry out the steps of the method as defined herein.

In a further aspect there is provided herein a computer-usable or computer-readable storage medium or data carrier or data carrier signal or combination of one or more thereof having stored thereon the computer program or comprising instructions, which, when executed by a device or computer herein, cause the device or computer to carry out the steps of the method as herein defined, or having stored thereon data for the performance of the method herein.

A computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. A storage medium may be comprised in a health information system or medications database.

The term "cloud computing" herein refers to a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

The flowchart and block diagrams in the flow diagrams illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

In a further aspect there is provided herein a method, system, computer program, computer-readable storage medium or data carrier comprising instructions or a data signal as hereinbefore or hereinbelow defined or described for use in healthcare, more particularly in monitoring medication treatment.

The system is now illustrated in non-limiting manner with reference to the figures.

Medication monitoring in clinical practice is currently delivered with patients attending periodic review appointments, taking up clinic, staff and facility time. Current practice relies on a rolling review system, which is not equipped to identify patients at risk of NA, and patients in need of urgent review, from patients satisfactorily managing appropriate medication.

FIG. 1 demonstrates hospitalisation rate by gap in therapy in a study of patients prescribed antipsychotic medication. Statistical significance, P, was 0.004. The hospitalisation rate illustrates that even small gaps in antipsychotic medication usage increase the risk of hospitalisation. Patients with a maximum therapy gap of 1 to 10 days within one year had almost a 2-fold increase in risk of hospitalisation.

FIG. 2a illustrates the wearable device (1) herein, comprising MAMU and wearable attachment (W), as a MAM bracelet. A non-intrusive bracelet is suitable for continuous wear by patient (P). FIG. 2b illustrates an embodiment of a wearable device (1) comprising MAMU (1a) and attachment (W) in the form of two elastic loops (12) suitable for securing about a patient member or body part, an item of apparel, or a further wearable device, typically a wearable senor such as a biomarker or biometric sensor (not shown) having data connectivity with short distance radio wave communications interface of communication unit (16). Interactive VDU (2) and interactive AP comprising speaker (31) and microphone (32) are illustrated, together with data communications unit (16) including hardware for short wave communication with the wearable ME sensor. FIG. 2c illustrates a high fidelity wearable device comprising a wearable attachment unit (W) which encircles the wrist and presents a curved outer profile, having high fidelity directional microphones (32), such as cardioid microphones disposed about the outer profile. Microphone directionality is indicated by fields (321). One or a plurality of microphones are selectable to detect patient interactive voice input in high sensitivity from any orientation of the device. FIG.

2*d* illustrates a modular wearable device (1) comprising modules (13) each representing an attachment unit. A module (13) comprises the operating unit (not shown) and VDU (2) and at least part of AP (speaker, 31) and docking port in the form of interlocking module attachments (131). Two further modules (13) are illustrated, comprising respectively an AP module comprising the microphone (32) configuration of FIG. 2*c*, and a component of ME sensor unit comprising a smart sensor material or layer of material (15).

FIG. 3*a* illustrates interactive VDU (2) of wearable device (1) herein. Interactive VDU (2) is readily viewed by the patient, and sized and shaped to display a medication reminder (21), together with dosage type and amount (22) and, simultaneously or subsequently, prompts or input fields (23) for response, more particularly medication dose response. Exemplary input prompts or fields (23) are illustrated: Taken, Ask me later, Not taken. Exemplary input prompts or fields (23) are also illustrated as a traffic light system: Taken—green, Ask me later—yellow, Not taken—red. Input response may be by selecting the appropriate response, or by text input.

FIG. 4*b* illustrates interactive AP (3) of wearable device (1) herein which includes speaker (31) configured to output a monitoring communication inviting a response by patient (P), and microphone (32) for patient audio input for voice analysis. Data communications unit (16) illustrated in FIG. 4*b* communicates with satellite (4) and MAMC (5) for output of audio reminder via speaker (31) and transmission of patient (P) input of audio medication dose response via microphone (32).

FIG. 5*a* illustrates units comprised in OU: processor (61), memory (62), timer unit (63), WCU (16), and MAMU comprising output peripherals VD (24) and SPK (31), input peripherals VDTOOL (25) and MIC (32) and input/output peripherals SU(s) (15), comprised in a power supply environment (67) and interfaced by responsive control unit (RCU, 64). FIG. 5*b* illustrates components of the MAMU of FIG. 5*a* including VDTOOL (25) and VD (24) comprised in VDU (2), MIC (32) and SPK (31) comprised in AP (3) and biomarker SU(s) (65) and biometric sensor unit(s) (66) comprised in ME Sensor Unit(s) (15). Medication response input via VDTOOL (21) and MIC (32) are markers of MA including patient motivation and other MA factors. PI and voice input via MIC (32) and biomarker sensor (AS, 65) is a marker of ME. ME data from Biomarker SU(s) (65) Biometric SU(s) (66) are also markers of ME. Biometric data from Biometric SU(s) (66) is also a marker of MA, more particularly of intentional NA herein, indicating the device not being worn or being worn other than by patient (P, not shown).

FIG. 6*a* illustrates the On-Demand MAM method. In step i) patient inputs a demand for medication options and data; processing unit retrieves and displays or emits (via VDU or AP) medication options and data, for example as drop down box, or audio menu. Patient selection prompts step ii) medication data displayed and/or emitted on interactive VDU and/or via interactive AP, together with prompt for response input. In step iii), response input is a) Stocks low/finished, reorder. Input transmitted to Pharmacy reorder and Treatment Program update. Alternatively or additionally response input is b) Taken. Service proceeds to step iv), Digitised Medication Treatment Program updated with dose and date and time stamp, the service loops back to step i).

FIG. 6*b* illustrates MAM device and method flowscheme interactions. In step i) Medication reminder is retrieved from Digital Medication Treatment Program and scheduled. In step ii) reminder is displayed and/or emitted on interactive VDU and/or via interactive AP, together with prompt for response input. In step iii), response input is a) Remind me later or no response input. Device or method loops back to step i) or ii) for a preset number or repeats, e.g. n=2. Alternatively response input is b) Taken. Device and method proceeds to step iv), Digital Medication Treatment Program updated and next reminder retrieved and scheduled, and loops back to step i). Alternatively response input is c) Not taken. Device and method proceeds to step iv), Digital MA Program updated: Response/Dose missed. Each response a), b) and c) leads to step v), MA performance data indicating MAR as a % adherence is output as a marker of self. Output is determined according to target adherence, and may be congratulatory or encouraging, eg "Not so good" or "Need to be better at . . . " In case of c) (including a) No response after n=2), an alert is issued to HP, intervention escalated or initiated, for example communication initiated and biometric and behavioural data including voice analysis, review consultation with HP scheduled; method proceeds to step vi) Remedial action, such as patient reassured on any concerns over medication, medication changed or administration route or time changed etc. Method loops back to step i), ii) or iii).

FIG. 7 illustrates a MAM network communication system including the wearable device (1) having WCU (16) in satellite communication connectivity (4, one or two satellites) and with MAMC (5) and fibre communication (7) with HP interface (8). In normal mode wearable (1) communicates to HAPS (41) as NB-IOT or via 700 Mhz—using multiple Software Defined Radio links to provide >1 Gb downlink if required, which communicates with terrestrial segment using Ku Band to MAMC (5). HAPS uses High Earth Orbit Satellite (4) for geopositioning and/or backhaul to the satellite groundstation (42) which will normally sit on high speed fibre backbone, The HP in a MAMC (5) may also have a Fibre link or, if mobile, connect to 4G LTE network. MAMC is a virtual or distributed service which includes HP in different settings (8).

FIG. 8 illustrates a patient identification tag (70), bearing a code (71) such as a bar code, QR code or other code identifying the patient, device and or patient healthcare account.

The invention has been described above in relation to its use for mental health care and mental health conditions. However, the very same principles may be used for any health disorder.

Although a few preferred embodiments have been shown and described, it will be appreciated by those skilled in the art that various changes and modifications might be made without departing from the scope of the invention. The invention extends to any novel one, or any novel combination, of the features disclosed in this specification (including any accompanying claims, abstract and drawings), or to any novel one, or any novel combination, of the steps of any method or process so disclosed.

EXAMPLES

Example 1—Effect of Medication Information on Medication-Taking Behaviour or Adherence, and Motivation to Take Medication Determined by MARS (Medication Adherence Rating Scale)

The Choice and Medication website https://www.choiceandmedication.org/provides high quality credible information on medication side effects and on condition symptoms to help patients make informed choices in medication and information on how to take medication correctly.

A group or patients who were given use of the website gained knowledge on dose mode and regime of prescribed medication, understanding of medications being taken and the effects of taking the medication. This improved confidence in discussing with HPs options to treatment, different medication alternatives, including dose mode, regimes and side effects, and fostering patient empowerment. Questionnaires (Table 1) were then Completed by Users of the Website

TABLE 1

MARS questionnaire

| Question | Answer |
| --- | --- |
| 1 Do you ever forget to take your medication? | Yes/No |
| 2 Are you careless at times about taking your medication? | Yes/No |
| 3 When you feel better, do you sometimes stop taking your medication? | Yes/No |
| 4 Sometimes if you feel worse when you take the medication, do you stop taking it? | Yes/No |
| 5 I take my medication only when I am sick | Yes/No |
| 6 It is unnatural for my mind and body to be controlled by medication | Yes/No |
| 7 My thoughts are clearer on medication | Yes/No |
| 8 By staying on medication, I can prevent getting sick | Yes/No |
| 9 I feel weird, like a 'zombie' on medication | Yes/No |
| 10 Medication makes me feel tired and sluggish | Yes/No |

Medication monitoring in clinical practice is currently delivered with patients attending periodic review appointments, taking up clinic, staff and facility time. Current practice relies on a rolling review system, which is not equipped to identify patients at risk of NA, and patients in need of urgent review, from patients satisfactorily managing appropriate medication.

A response consistent with non-adherence is coded as 0, whereas a response consistent with adherence is coded as 1. For questions 1-6 and 9-10, a no response is indicative of adherence and is coded as 1, while for questions 7 and 8, a yes response is indicative of adherence and is coded as 1. Total scores on the MARS may range between 0 and 10, with a lower score indicating poor MA: non-compliant or rarely compliant and a higher score indicating better MA: sometimes compliant to compliant. Improved MA was indicated by a clinically significant change in MAR.

A statistically significant improvement in MAR was observed. Evidence included movement from "rarely" complied to "sometimes" complied with treatment, which showed a positive change in adherence. Any improvement was considered clinically beneficial, no matter how small, because the consequences of not adhering, in this case to mental health medication, was increased morbidity and mortality.

The example concluded that improved knowledge, understanding, confidence and empowerment were characteristics of a positive patient experience and was an antecedent to a health behaviour change. The resulting post intervention outcome was increased motivation to take medication.

Comparative Example—ME in Patient not Subject to Monitoring

Clozapine is an important agent in effectively treating patients with schizophrenia (PWS). Usual doses 4 range from 200 mg to 450 mg (maximum of 900 mg daily). The manufacturer's summaries of product characteristics states that if the medication is not taken for 2 days it must be restarted at 12.5 mg with a maximum dose titration of 50 mg. The speed of titration is dictated by preventing adverse effects including hypotension, tachycardia and seizures and so requires close monitoring.

Patients 1 and 2 demonstrate poor MA, stopping and restarting Clozapine at any point.

Patient 1 is unsupervised. ME is first observed as critical level of a marker of potentially fatal adverse drug reactions including neutropenia, agranulocytosis and myocarditis.

Patient 2 is supervised. ME is first observed as an incidence of critical non-adherence, when a two day break is observed by a HP. A re-titration of the medication is initiated with small incremental increases and more regular blood monitoring requiring additional contact time for the patient.

Example 2—Improving Healthcare Outcome by Means of Patient Input in Monitoring Medication Treatment Via Wearable Device Patients 1 and 2 are provided with the wearable device herein.

In both cases ME is observed as a single incidence of non-adherence, when the patient reports medication not taken or fails to report on two consecutive medications. Remote monitoring detects notifications of missed doses and enables HP intervention before a two day break in MA. This ultimately leads to prevention of adverse drug reaction in patient 1 and of a re-titration in both patients 1 and 2, and the associated time and costs from HP to support this. The benefit of the device in incorporating adherence as a marker of medicines actually taken can be observed in improve patient safety. The benefit of the device providing a clear treatment picture to both patients can be observed in reduced incidence of non-adherence.

The invention claimed is:

1. A wearable medication adherence monitoring (MAM) device for wearing by a patient, comprising an operating unit (OU) which comprises: a wireless communications unit (WCU) comprising a communications interface for accessing at least one communications network and for communication of data and signals between the device and a remote address comprising a MAM center (MAMC); a processing unit (CPU); a memory unit; and one or a plurality of peripheral interface(s) with a plurality of input peripherals configured to send data, signals or a combination of data and signals to the OU and a plurality of output peripherals configured to receive data, signals or a combination of data and signals from the OU; wherein the OU is configured to access and store, process, output, communicate or a combination thereof, data and signals relating to medication adherence (MA), including data relating to digitized medication dose charts;

and further comprising the plurality of input peripherals and output peripherals in a MAM unit (MAMU) which comprises:
an interactive visual display unit (VDU) comprising a visual display (VD) and a VD patient interaction (PI) tool (VDTOOL); and an interactive audio platform (AP) comprising an audio output unit (SPK) and an audio PI tool (MIC) comprising one or a plurality of acoustic sensor(s) (AS(s)), microphone units or arrays which is/are directly or indirectly responsive to voice, configured for VD and audio PI and MAMC interaction (CI) and generating PI data, signal(s) or a combination of data and signals relating to MA wherein each of VD and SPK comprises an interface for receiving data, signals or a combination of data and signals from the OU and each of VDTOOL and MIC comprises an interface for sending data, signals or a combination of data and signals to the OU; and a plurality of sensor unit(s) (SU(s)) comprising a plurality of biomarker sensors, and optionally at least one biometric sensor configured for sensing a patient biomarker(s) and optionally a patient biometric marker(s) or indicator(s) of MA and generating patient physical and/or mental wellbeing (PPMW) data or signal(s) indicative of MA wherein each SU comprises an interface for sending data, signals or a combination of data and signals to the OU;

and further comprising OU and MAMU comprised in one or a plurality of attachment units (AU) for wearing of the device on or about a body part of the patient, more particularly on or about a forearm or part thereof such as wrist or hand or finger of the patient;

wherein one or both of MIC and an SU is configured to generate high fidelity patient audio signals in a frequency range of human speech or human vocalization, for a voice or vocal analysis indicative of MA;

one or a plurality of SU(s) comprise a sensor material or a sensor system comprising a combination of material(s) which is an active smart material or an active smart system which is responsive to a patient stimulus by a response comprising a reversible measurable material property change, wherein the response is self-powered or is powered by the patient stimulus; and wherein the input peripherals comprise VDTOOL, MIC and SU(s) and are comprised in a triangulation source environment of the MAMU configured to send data, signals or a combination of data and signals relating to and indicative of MA to the OU from at least three sources including PI, patient voice or vocalization and PPMW for a local triangulation or a remote triangulation thereof, and the output peripherals comprise VD and SPK and optionally additionally one or a plurality of SU(s) and are comprised in a triangulation control environment of the MAMU configured to receive data, signals or a combination of data and signals relating to MA from the OU for a direct control or an indirect control of said triangulation source environment;

wherein the AU comprises a combination or array of independently selectable and operable directional microphones MIC, mounted for different orientations relevant to a patient wearing the device;

and wherein the plurality of biomarker sensors comprises a sensor of body temperature, a sensor of heart rate and a hydration sensor.

2. The wearable device as claimed in claim 1, which is partially self-powered, wherein the device further comprises one or a plurality of power supply unit(s) (PSU(s)), wherein a PSU comprises at least two energy harvesting unit(s) (EHU(s)) configured for harvesting energy of different types, selected from thermal differential energy, solar energy and patient kinetic energy;

together with one or a plurality of energy storage cell(s) (ESC(s)) selected from a capacitor, supercapacitor and rechargeable battery and combinations thereof, wherein the EHU comprises a smart material or smart system which is responsive to a stimulus of the patient or the patient's environment by a response comprising a reversible material property change and which comprises a material or system selected from ferroelectric, piezoelectric, triboelectric, thermoelectric, pyroelectric, photovoltaic, magnetostrictive, electromagnetic and combinations thereof.

3. The wearable device as claimed in claim 1, further comprising a biometric sensor of the device not being worn or being worn by a person other than the patient, comprising a biometric sensor of an identifier of the patient, selected from an iris or face recognition sensor associated with an AP camera configured for recognition of the patient.

4. The wearable device as claimed in claim 1, wherein the AU comprises a flexible material or combination or materials which is an extruded or a 3D printed or a 4D printed flexible material or combination of materials, which is flexibly toughened or reinforced, wherein the material(s) or a surface of the material(s) comprise cut-resistant material(s).

5. The wearable device as claimed in claim 1, wherein the AU comprises a combination of materials, in a plurality of layers, zones or phases, comprised within cushioning silicone gel embedding material.

6. The wearable device as claimed in claim 1, wherein AU presents a continuous curved outward facing face adapted to encircle a member or body part of the patient in skin contact therewith, wherein one or more sensors comprise a material or system selected from piezoelectric, triboelectric, magnetostrictive, electromagnetic, pyroelectric or thermoelectric, shape memory, pH-sensitive, thermochromic, chromoactive, chemochromic, photoactive, electroactive, photoelectric and combinations thereof.

7. The wearable device as claimed in claim 1, which is an advisory wearable device, wherein the attachment unit is flexible or conformable and wherein the biometric sensor is a biometric fingerprint recognition sensor of a marker or indicator that the device is being worn by the patient, comprised in a part of the MAMU or the AU which is configured for operation by a patient touch, such as the VDTOOL, a control of the AP selected from a volume control and a call-initiate or call-accept control.

8. The wearable device as claimed in claim 1, wherein the AU is configured for conformable skin contact and comprises flexible polymer, hydrogel and/or elastomer materials and wherein VD comprises a flexible polymer organic light emitting diode (OLED).

9. The wearable device as claimed in claim 1, which is a modular wearable device, or a kit therefor, wherein the units are comprised in a plurality of independently wearable modules comprised in a plurality of AUs wherein a primary module comprises the OU, the VDU and the SPK and optionally one or a plurality of MIC and one or a plurality of SU, and one or a plurality of secondary modules comprises one or a plurality of SPK and/or one or a plurality of SU, wherein each AU comprises one or a plurality of module docking points provided on a side of a AU for docking with a corresponding docking point of a module comprising an interlocking AU, whereby the modular device gives the appearance of a unitary wearable.

10. The wearable device as claimed in claim 9, wherein a module docking point is comprised in a module recess, and removable seal is profiled to cover or fill the module recess, whereby the device presents a smooth sealed profile.

11. The wearable device as claimed in claim 9, wherein a plurality of modules are provided on a plurality of interlocking AUs, comprising interlocking wrist bands.

12. The wearable device as claimed in claim 9, wherein interlocking module docking points or module AUs are of a snap fit or a sleeve interlocking type.

13. The wearable device comprising and hydration sensor as claimed in claim 1, for use in MAM in relation to a medication for one or more chronic conditions or disorders selected from diabetes, cardiac, cancer, and mental health including psychiatric and schizophrenia.

14. The wearable device as claimed in claim 1 when programmed to carry out the steps of a computer implemented method for interactive bidirectional medication administration monitoring (MAM) for a patient in receipt of a medication, by means of the wearable device, comprising:
a MAM step of causing the CPU to access locally, in a memory unit, or remotely, at a MAMC address, data, signals or a combination of data and signals relating to MA including data relating to a personalized MA program and to retrieve a medication dose data together with a MA status query;
a PI control step of causing at least one of said interactive VDU and said interactive AP to display or emit said medication dose data and said MA status query;
a PI step of causing said patient to be receptive to said dose data and status query and causing the interactive VDTOOL, interactive MIC or a combination thereof to receive a PI data, signals or a combination of data and signals relating to a MA status responsive to said MA status query;
a MA program-updating step of causing said CPU and said memory unit to update said MA program with said PI data, signals or combination of data and signals relating to said MA status or to transmit said data, signals or combination of data and signals for a remote updating; and
a PI triangulation source step of causing said WCU to transmit in a real time, said PI data, signals or combination of data and signals to MAMC;
and comprising a PPMW sequence comprising:
a PPMW monitoring control step of causing the CPU to access a PPMW data or signals generated by a plurality of SUs and optionally additionally one or more AS(s) as a marker or indicator of MA;
a PPMW triangulation source step of causing said WCU to transmit said PPMW data or signals to MAMC;
and comprising a voice capture sequence comprising:
a voice control step of causing a voice capture unit (VCU) to capture voice PI data or signals received by said MIC or received by said AS, indicative of MA; and
a voice triangulation source step of causing said WCU to transmit in a real time said voice PI data or signals to MAMC;
wherein the method comprises
a triangulation sequence comprising:
a triangulation step of causing a local or remote processor to receive said PI, voice and PPMW data and signals and to identify a deviations from a normal as an indicator of MA,
wherein the PPMW data is generated by SU(s) response(s) to a patient stimulus indicative of MA which is self-powered or is powered by the stimulus and wherein the control steps control the generation of effective triangulation source data and/or signals;
and wherein the PI data generated by a combination or array of independently selectable and operable directional microphones MIC, mounted for different orientations relevant to a patient wearing the device, is obtained by selection and activation of a specific microphone or directionality by command entered into the device by the patient or remotely by the MAM center,
and wherein the PPMW data or signals is generated by a plurality of biomarker SUs comprising a sensor of body temperature, a sensor of heart rate and a hydration sensor.

15. The wearable device as claimed in claim 1, wherein the device is secure whereby it cannot be removed by the patient, wherein the AU comprises a lockable clasp comprising a locking pin or lever.

16. The wearable device as claimed in claim 1, wherein the device is secure whereby it cannot be removed by the wearer, wherein the AU comprises an electronic lock, or a magnet, solenoid or motor operated clasp.

17. The wearable device as claimed in claim 1, wherein the device is secure whereby it cannot be removed by the wearer, wherein the AU comprises a lockable clasp which is remotely operated.

18. The wearable device as claimed in claim 1, wherein MIC comprises a cardioid microphone having high forward and side sensitivity in a symmetrical or asymmetric 3D cardioid plane curve disposed forward and to the sides of the microphone (MIC), configured for enhanced sensitivity oriented towards and to the side of the patient compared to orientation away from the patient.

19. The wearable device as claimed in claim 1, wherein AU presents a continuous curved outward facing face adapted to encircle a member or body part of the patient in skin contact therewith, comprising a plurality of cardioid microphones, spaced apart along the length of the AU, wherein each microphone is characterized by its orientation relative to the encircled patient member or body part.

20. A method for the manufacture of the wearable device as claimed in claim 1 wherein one or a plurality of SUs are embedded in the AU, and in communication with the OU by wireless SR-RF connectivity, or by printed or optical circuitry, which comprises laying up units or modules or parts thereof on a support scaffold, comprising a pre-formed component of the attachment unit, and forming the attachment unit thereabout, wherein the attachment unit and a pre-formed scaffold are formed by means of a 3D printing technique employing one or more polymers, copolymers or combinations thereof or combinations with a filler selected from an organic or inorganic substrates,
wherein units comprise a combination or array of independently selectable and operable directional microphones MIC, and the method comprises laying up for different orientations relevant to a patient wearing the device;
and wherein units further comprise a plurality of biomarker sensor units comprising a sensor of body temperature, a sensor of heart rate and a hydration sensor, whereby one or a plurality thereof are embedded in the AU.

* * * * *